(12) United States Patent
Han et al.

(10) Patent No.: US 6,771,835 B2
(45) Date of Patent: Aug. 3, 2004

(54) TWO-DIMENSIONAL NON-LINEAR INTERPOLATION SYSTEM BASED ON EDGE INFORMATION AND TWO-DIMENSIONAL MIXING INTERPOLATION SYSTEM USING THE SAME

(75) Inventors: Yong In Han, Seongnam (KR); Hweihn Chung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 658 days.

(21) Appl. No.: 09/846,759

(22) Filed: May 1, 2001

(65) Prior Publication Data

US 2002/0012464 A1 Jan. 31, 2002

(30) Foreign Application Priority Data

Jun. 12, 2000 (KR) ............................................. 00-32101
Jul. 4, 2000 (KR) ............................................. 00-37964

(51) Int. Cl.[7] .............................. G06K 9/40; G06K 9/48; G06F 17/10

(52) U.S. Cl. ....................... 382/260; 382/199; 382/300; 708/304

(58) Field of Search ................................. 382/260–266, 382/300, 199, 278, 279, 100, 210, 276; 348/163, 447, 448; 375/229, 240.29; 708/300, 304; 73/146

(56) References Cited

U.S. PATENT DOCUMENTS 5,368,033 A * 11/1994 Moshfeghi .................. 600/419
5,467,439 A   11/1995 Lee et al. ................... 395/133

(List continued on next page.)

FOREIGN PATENT DOCUMENTS

JP         11261849         9/1999         .......... H04N/5/208

OTHER PUBLICATIONS

Gersho, "Optimal Nonlinear Interpolative Vector Quantization", IEEE 9–1990 Transactions on Communication, vol. 38, No. 9, pp. 1285–1287.*

(List continued on next page.)

*Primary Examiner*—Jayanti K. Patel
(74) *Attorney, Agent, or Firm*—Mills & Onello, LLP

(57) ABSTRACT

A 2-dimensional non-linear interpolation system and method based on edge information includes an edge detector, an edge direction modifier, a near-edge coefficient generator, a filter coefficient generator and a non-linear interpolation unit. The edge detector detects edge information among pixels from a video signal applied through an input terminal. The edge direction modifier converts the edge information detected by the edge detector on the basis of a center point among peripheral pixels of an interpolation position and outputs modified edge information. The near-edge coefficient generator converts the coordinates of the interpolation position based on the modified edge information to generate a converted interpolation position, generates edge patterns corresponding to the converted interpolation position, and generates a plurality of 2-dimensional interpolation coefficients in response to predetermined one-dimensional non-linear interpolation filter coefficients. The filter coefficient generator generates the one-dimensional non-linear interpolation filter coefficients in response to the coordinates of the converted interpolation position, the edge patterns and predetermined one-dimensional filter coefficients. The non-linear interpolation unit multiplies data values associated with the peripheral pixels by the plurality of 2-dimensional non-linear interpolation coefficients to perform non-linear interpolation. Accordingly, even when a video image is magnified using non-linear interpolation, the resolution of a text or graphic image can be maintained without distortion of edges and aliasing.

19 Claims, 16 Drawing Sheets

U.S. PATENT DOCUMENTS

| | | | |
|---|---|---|---|
| 5,748,788 A | | 5/1998 | Moro .......................... 382/243 |
| 5,799,113 A | * | 8/1998 | Lee ............................ 382/256 |
| 5,936,681 A | | 8/1999 | Kameoka et al. ............ 348/625 |
| 6,236,766 B1 | * | 5/2001 | Zavaljevski et al. ........ 382/300 |
| 6,307,569 B1 | * | 10/2001 | Ratakonda .................. 345/671 |
| 6,392,765 B1 | * | 5/2002 | Sakaida ...................... 358/525 |
| 6,411,305 B1 | * | 6/2002 | Chui ........................... 345/660 |
| 6,570,673 B2 | * | 5/2003 | Kishimoto .................. 358/1.2 |
| 6,714,688 B1 | * | 3/2004 | Gallagher et al. .......... 382/266 |

OTHER PUBLICATIONS

Lee, "Nonlinear Interpolation", IEEE Transactions on Information Theory, VOL IT–17, Jan. 1971, pp. 45–49.*

Rajala et al., "Adaptive Nonlinear Image Restoration by a Modified Kalman Filtering Approach", IEEE Transactions on Acoustic Speech and Signal Processing, vol. ASSP–29, No. 5, Oct. 1981, pp. 1033–1042.*

Crino et al., "Adaptive Model–based Motion Estimation" IEEE Transactions on Image Processing, vol. 3, No. 5, 9–1994, pp. 469–481.*

* cited by examiner

FIG. 5A CASE 1 : CTR_EDG : 001 (CORNER)
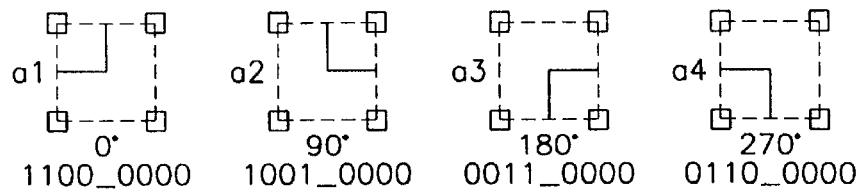
FIG. 5B CASE 2 : CTR_EDG : 010 (PERPENDICULAR)
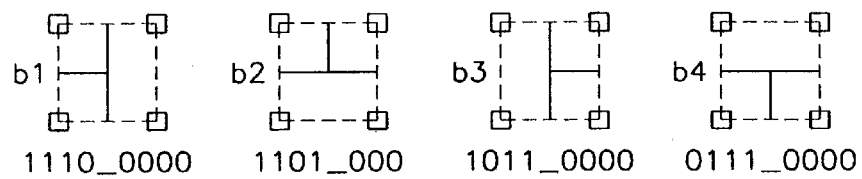
FIG. 5C CASE 3 : CTR_EDG : 011 (FULL LINE)
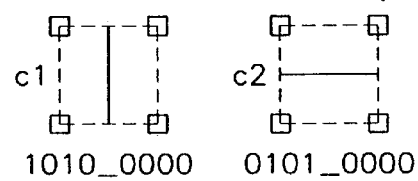
FIG. 5D CASE 4 : CTR_EDG : 100 (CROSS BAR)
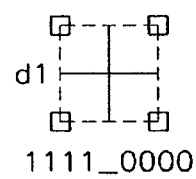
FIG. 5E CASE 5 : CTR_EDG : 101 (HALF LINE)
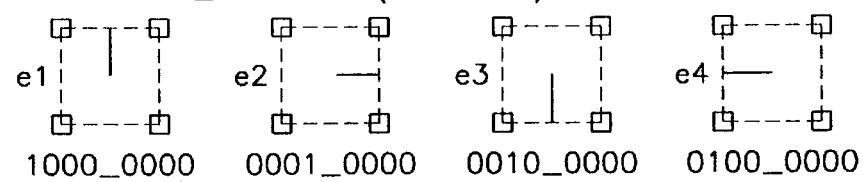
FIG. 5F CASE 6 : CTR_EDG : 110 (DIAGONAL)
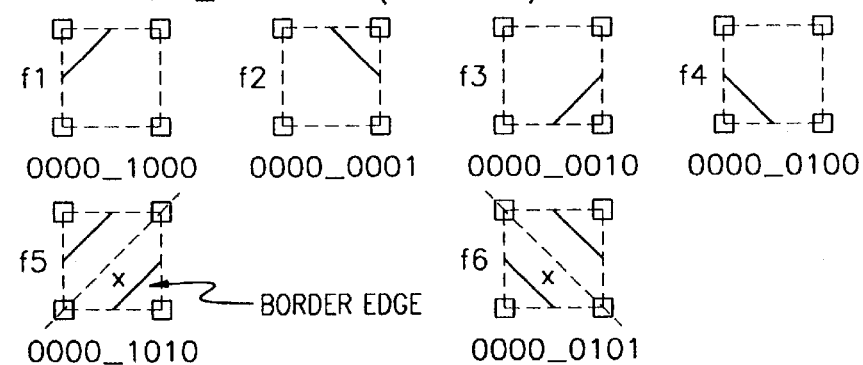

| CASE \ WEIGHT | WNW | WNE | WSW | WSE |
|---|---|---|---|---|
| FIG. 9A | TX*TY | (1−WNW)*C_CY | (1−WNW)*C_CX | (1−WNW)*(CX+CY−1) |
| FIG. 9B | TX*TY | C_TX*C_CY | TX*C_TY | C_TX*Y |
| FIG. 9C | TX*C_CY | C_TX*C_CY | TX*CY | C_TX*Y |
| FIG. 9D | TX*TY | C_TX*TY | TX*C_TY | C_TX*C_TY |
| FIG. 9E | TX*C_CY | C_TX*C_CY | C_CX*CY | CX*CY |
| FIG. 9F | IF (CX+CY) >1, THEN 0; IF (CX+CY)≤1, THEN T(X+Y) | IF (CX+CY)>1, THEN C_CY; IF (CX+CY)≤1, THEN (1−WNW)*(1+CX−CY)/2 | IF (CX+CY)>1, THEN C_CX; IF (CX+CY)≤1, THEN (1−WNW)*(1−CX+CY)/2 | IF (CX+CY)>1, THEN CX+CY−1; IF (CX+CY)≤1, THEN 0 |

FIG. 9A
FIG. 9B
FIG. 9C
FIG. 9D
FIG. 9E
FIG. 9F

TWO-DIMENSIONAL NON-LINEAR INTERPOLATION SYSTEM BASED ON EDGE INFORMATION AND TWO-DIMENSIONAL MIXING INTERPOLATION SYSTEM USING THE SAME

BACKGROUND OF THE INVENTION

1. Field of the Invention

The present invention relates to a video processing system, and more particularly, to a 2-dimensional non-linear interpolation system based on edge information and a 2-dimensional mixing interpolation system using the same.

2. Description of the Related Art

Generally, interpolation is used to perform a zooming function for magnifying or reducing a video signal. Video signals may include a signal having only a natural image or a signal in which text or graphics is mixed with a natural image. In the case of television sets, most video signals displayed have only natural images. On the other hand, computer monitors frequently output video signals in which text, graphics and natural images are mixed. For the magnification of complex video including text or graphics and a natural image to have a suitable output aspect ratio, it is essential for the interpolation to maintain the resolution of edges at portions such as graphics at which edge information is important, even after the interpolation.

However, many of the currently used interpolation methods are based on linear interpolation between pixels. These methods are advantageous in that noise decreases in natural image regions, but disadvantageous in that edge information cannot be effectively represented in graphic regions, when a video is magnified. Since edges are not specially considered in the linear interpolation, aliasing may occur at the edges. Consequently, edges are not represented clearly.

When magnifying an image using conventional 2-dimensional linear interpolation, smooth video without noise can be reproduced in natural image regions due to a smoothing effect. However, degradation in which edges become dull occurs in graphic image regions due to loss of high frequency components.

SUMMARY OF THE INVENTION

To address the above limitations, it is a first object of the present invention to provide a 2-dimensional non-linear interpolation system based on edge information, for clearly representing edges using 2-dimensional non-linear interpolation when a video signal is magnified.

It is a second object of the present invention to provide a interpolation method performed by the 2-dimensional non-linear interpolation system.

It is a third object of the present invention to provide a 2-dimensional mixing interpolation system for preventing the edge of a graphic image from being degraded when a video signal including both a natural image and a graphic image is magnified.

It is a fourth object of the present invention to provide a mixing interpolation method performed by the 2-dimensional mixing interpolation system.

In this manner, a new interpolation method is provided for reproducing smooth video images without noise due to a smoothing effect through interpolation, while preventing degradation of edges in graphic image regions.

Accordingly, to achieve the first object of the invention, there is provided a 2-dimensional non-linear interpolation system based on edge information. The system includes an edge detector, an edge direction modifier, a near-edge coefficient generator, a filter coefficient generator and a non-linear interpolation unit. The edge detector detects edge information among pixels from a video signal applied through an input terminal. The edge direction modifier converts the edge information detected by the edge detector on the basis of a center point among peripheral pixels of an interpolation position and outputs modified edge information. The near-edge coefficient generator converts the coordinates of the interpolation position based on the modified edge information to generate a converted interpolation position, generates edge patterns corresponding to the converted interpolation position, and generates a plurality of 2-dimensional interpolation coefficients in response to predetermined 1-dimensional non-linear interpolation filter coefficients. The filter coefficient generator generates the 1-dimensional non-linear interpolation filter coefficients in response to the coordinates of the converted interpolation position, the edge patterns and predetermined 1-dimensional filter coefficients. The non-linear interpolation unit multiplies data values associated with the peripheral pixels by the plurality of 2-dimensional non-linear interpolation coefficients to perform non-linear interpolation.

To achieve the second object of the invention, there is provided a method of performing 2-dimensional non-linear interpolation on an input video signal. The method includes steps (a) through (d). In step (a), edge information is detected from the input video signal. In step (b), the detected edge information is modified to generate modified edge information. In step (c), 2-dimensional non-linear interpolation coefficients are generated in response to the modified edge information and predetermined 1-dimensional non-linear interpolation filter coefficients. In step (d), data values associated with peripheral pixels around a current interpolation position are multiplied by the 2-dimensional non-linear interpolation coefficients, thereby performing non-linear interpolation on the video signal.

To achieve the third object of the invention, there is provided a 2-dimensional mixing interpolation system including an edge detection and non-linear interpolation coefficient generation unit, a linear interpolation unit, a non-linear interpolation unit and a multiplexer. The edge detection and non-linear interpolation coefficient generation unit detects edge information among pixels from a video signal input through an input terminal, modifies the detected edge information according to predetermined edge patterns, obtains a plurality of 2-dimensional non-linear interpolation coefficients based on the modified edge information among a plurality of adjacent pixels around a pixel to be interpolated, and generates an edge signal indicating the absence or existence of an edge among the plurality of adjacent pixels around the pixel to be interpolated. The linear interpolation unit multiplies data values associated with n*n pixels around the pixel to be interpolated by vertical interpolation coefficients and by horizontal interpolation coefficients to perform linear interpolation. The non-linear interpolation unit multiplies data values associated with the plurality of adjacent pixels by the plurality of 2-dimensional non-linear interpolation coefficients to perform non-linear interpolation near an edge. The multiplexer selectively outputs an interpolated pixel from the linear interpolation unit or an interpolated pixel from the non-linear interpolation unit in response to the edge information.

To achieve the fourth object of the invention, there is provided a method of performing 2-dimensional mixing interpolation on an input video signal. The method includes steps (a) through (e). In step (a), edge information among a plurality of adjacent pixels around a pixel to be interpolated is detected from the input video signal, and the detected edge information is modified into a predetermined edge pattern. In step (b), a plurality of 2-dimensional non-linear interpolation coefficients are obtained based on the edge pattern. In step (c), it is determined whether an edge exists among the plurality of pixels around the pixel to be interpolated. In step (d), data values associated with n*n pixels around the pixel to be interpolated are multiplied by a plurality of vertical and horizontal interpolation coefficients to perform linear interpolation when it is determined that an edge does not exist in step (c). In step (e), data values associated with the plurality of adjacent pixels are multiplied by the plurality of 2-dimensional non-linear interpolation coefficients to perform non-linear interpolation near an edge when it is determined that an edge exists in step (c).

BRIEF DESCRIPTION OF THE DRAWINGS

The above objectives and advantages of the present invention will become more apparent by describing in detail preferred embodiments thereof with reference to the attached drawings in which:

FIGS. 5A through 5F are diagrams illustrating prototype center edges generated by the prototype center edge and rotation angle determiner of FIG. 4;

FIGS. 9A through 9F are diagrams illustrating calculation procedures performed by the near-edge interpolation coefficient calculator of FIG. 8;

DETAILED DESCRIPTION OF PREFERRED EMBODIMENTS

Hereinafter, a 2-dimensional non-linear interpolation system based on edge information according to the present invention will be described with reference to the attached drawings.

Figure 1:
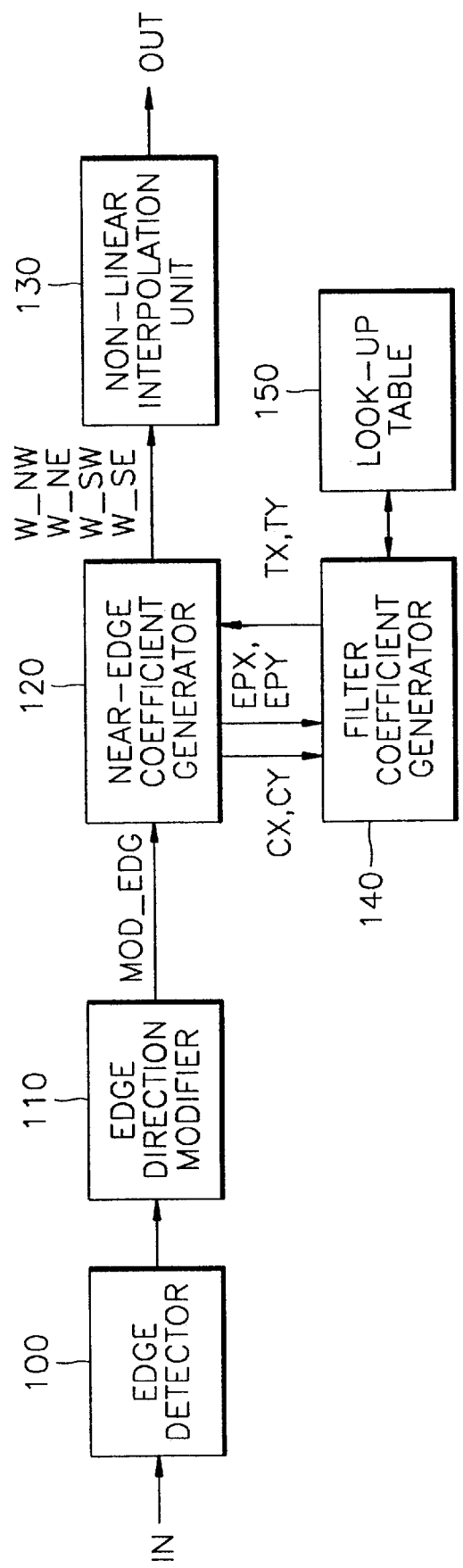
FIG. 1 is a block diagram illustrating a 2-dimensional non-linear interpolation system according to an embodiment of the present invention.

Referring to FIG. 1, the 2-dimensional non-linear interpolation system includes an edge detector 100, an edge direction modifier 110, a near-edge coefficient generator 120, a non-linear interpolation unit 130, a filter coefficient generator 140 and a look-up table 150.

The edge detector 100 detects edges in a video signal input through an input terminal IN and obtains edge information between pixels.

The edge direction modifier 110 modifies the edge information detected by the edge detector 100 and generates modified edge information MOD_EDG including diagonal components with reference to a center point among four adjacent pixels. Here, the modified edge information MOD_EDG can be divided into a border edge and a center edge. The center edge includes internal horizontal, vertical and diagonal components above, below, and to the left and right of the center point.

The near-edge coefficient generator 120 converts an interpolation position based on the modified edge information MOD_EDG to generate a converted interpolation position (CX, CY) and generates edge patterns EPX and EPY corresponding to the converted interpolation position (CX, CY). The converted interpolation position (CX, CY) and the edge patterns EPX and EPY are applied to the filter coefficient generator 140. The near-edge coefficient generator 120 generates a final 2-dimensional non-linear interpolation coefficients W_NW, W_NE, W_SW and W_SE in response to 1-dimensional non-linear interpolation filter coefficients TX and TY generated by the filter coefficient generator 140. The 2-dimensional non-linear interpolation coefficients W_NW, W_NE, W_SW and W_SE are defined as coefficients by which the four adjacent pixels surrounding the current interpolation position are multiplied. More specifically, W_NW denotes a coefficient by which an upper left pixel is multiplied, W_NE denotes a coefficient by which an upper right pixel is multiplied, W_SW denotes a coefficient by which a lower left pixel is multiplied, and W_SE denotes a coefficient by which a lower right pixel is multiplied.

The filter coefficient generator 140 selects 1-dimensional filter coefficients from 1-dimensional filter coefficients stored in the look-up table 150 on the basis of the position of an interpolation point and also on the basis of the type of edge of the interpolation point. The filter coefficient generator 140 also outputs filter coefficients corresponding to the converted interpolation position (CX, CY) and the edge patterns EPX and EPY among the 1-dimensional interpolation filter coefficients as the 1-dimensional non-linear interpolation filter coefficients TX and TY. The look-up table 150 stores 1-dimensional filter coefficients related to linear interpolation and to non-linear interpolation. The look-up table 150 can be realized as at least one read only memory (ROM).

The non-linear interpolation unit 130 multiplies the four adjacent pixels by respective final 2-dimensional non-linear interpolation coefficients, which are generated by the near-edge coefficient generator 120, thereby performing interpolation at the interpolation point, and outputs the results of the multiplication through an output terminal OUT. For example, when the coordinates of an interpolation position are (x, y), and the positions of four adjacent pixels surrounding the interpolation position are represented by A, B, C and D, respectively, an interpolated pixel value I at the coordinates (x, y) can be expressed as A*(W_NW)+B*(W_NE)+C*(W_SW)+D*(W_SE).

Figure 2A:
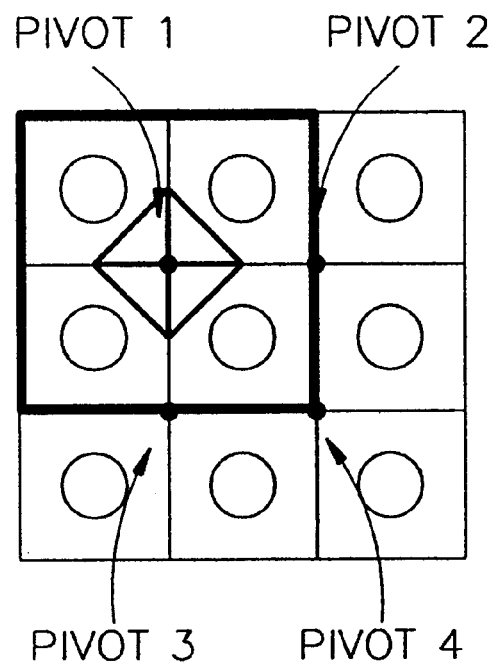
FIGS. 2A and 2B, are diagrams illustrating the procedure and the result of modifying an edge on the basis of an interpolation point in the system of FIG. 1.
Figure 2B:
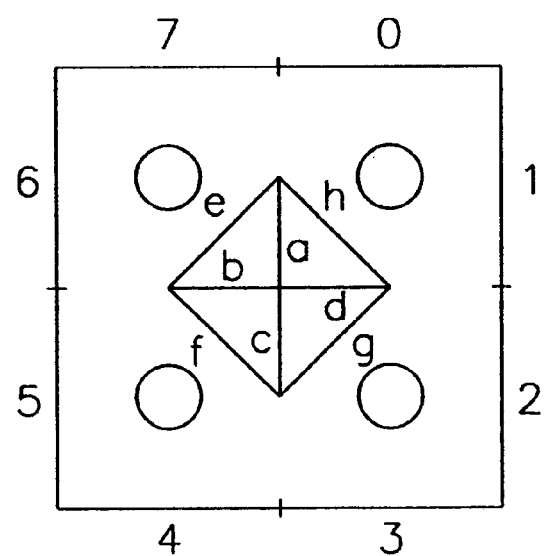
Figures 3A, 3B, 3C, 3D:
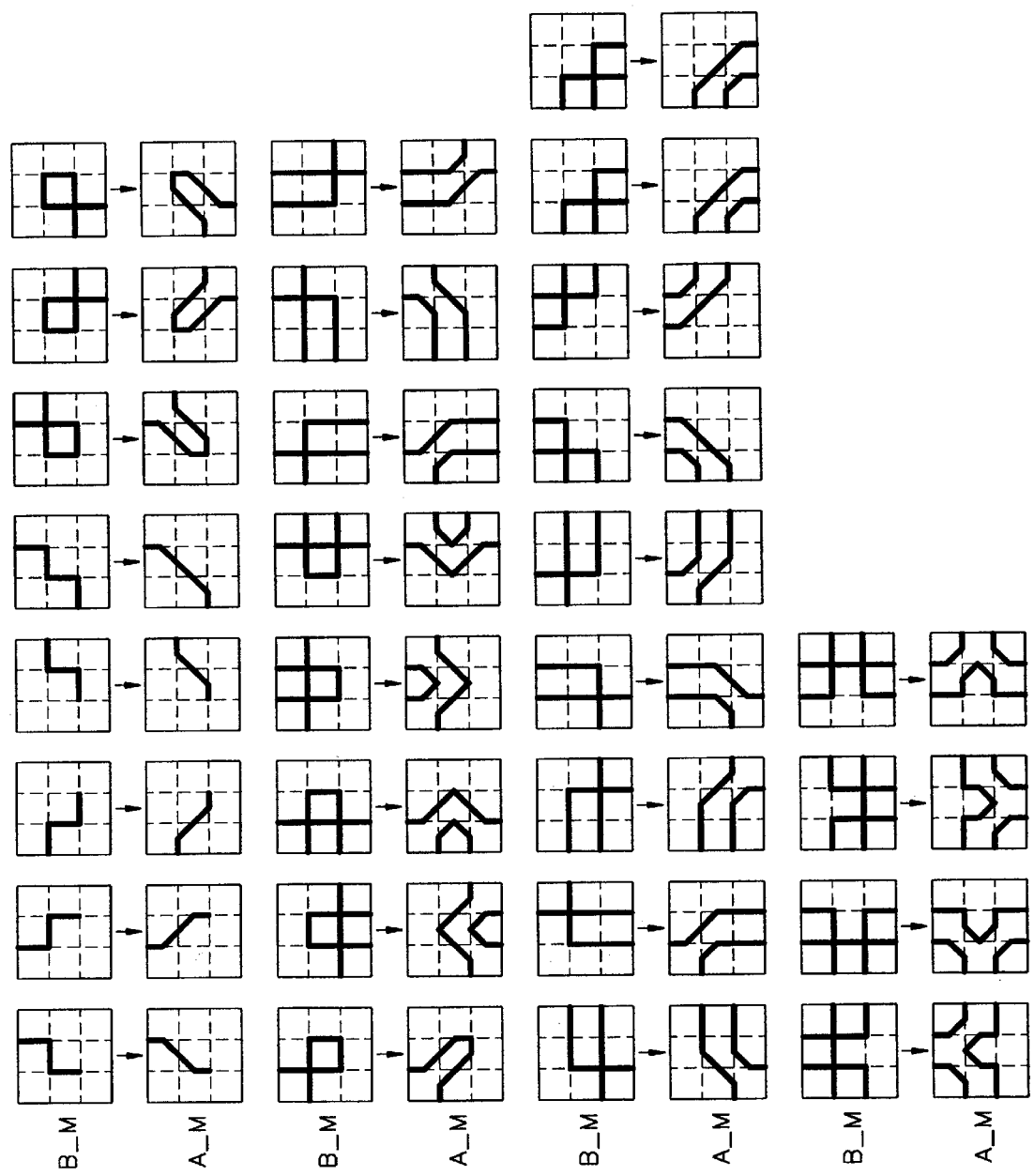
FIGS. 3A through 3D are diagrams illustrating predefined modification models in units of 3*3 blocks which are necessary for the edge modification illustrated in FIG. 2.

FIGS. 2A and 2B are diagrams illustrating the output and the operation of the edge direction modifier 110 of FIG. 1. FIG. 2A illustrates the modification of an edge with respect to a 3*3 block, and FIG. 2B illustrates a border edge and a center edge, which are generated through the edge modification.

Referring to FIG. 2A, each of pivots 1 through 4 is the center point of four adjacent pixels in a 3*3 block. To clearly represent the edge of graphics or text in the present invention, an edge composed of only vertical and horizontal components is modified into an edge further including a diagonal component by modifying the direction of the edge. Accordingly, a center edge and a border edge surrounding an interpolation point existing among four adjacent pixels around a pivot, as shown on FIG. 2A, are obtained, as shown in FIG. 2B. Referring to FIG. 2B, the border edge is composed of portions represented by reference numerals 0 through 7, and the center edge is composed of portions represented by reference characters a through h. Therefore, each of the border edge and the center edge is represented using 8 bits, i.e., 0–7 or a–h.

FIGS. 2A through 2D illustrate a variety of patterns referred to for modifying the direction of an edge illustrated in FIGS. 2A and 2B. In particular, FIGS. 2A through 2D illustrate patterns resulting from the modification of an edge in a 3*3 block. In FIGS. 3A through 3D, B_M denotes edge information before modification, and A_M denotes edge information after modification.

As shown in FIGS. 3A through 3D, horizontal and vertical edge patterns within a 3*3 block are mostly modified into diagonal components. In other words, in the present invention, horizontal or vertical edge information is modified into edge information including diagonal edge information.

Figure 4:
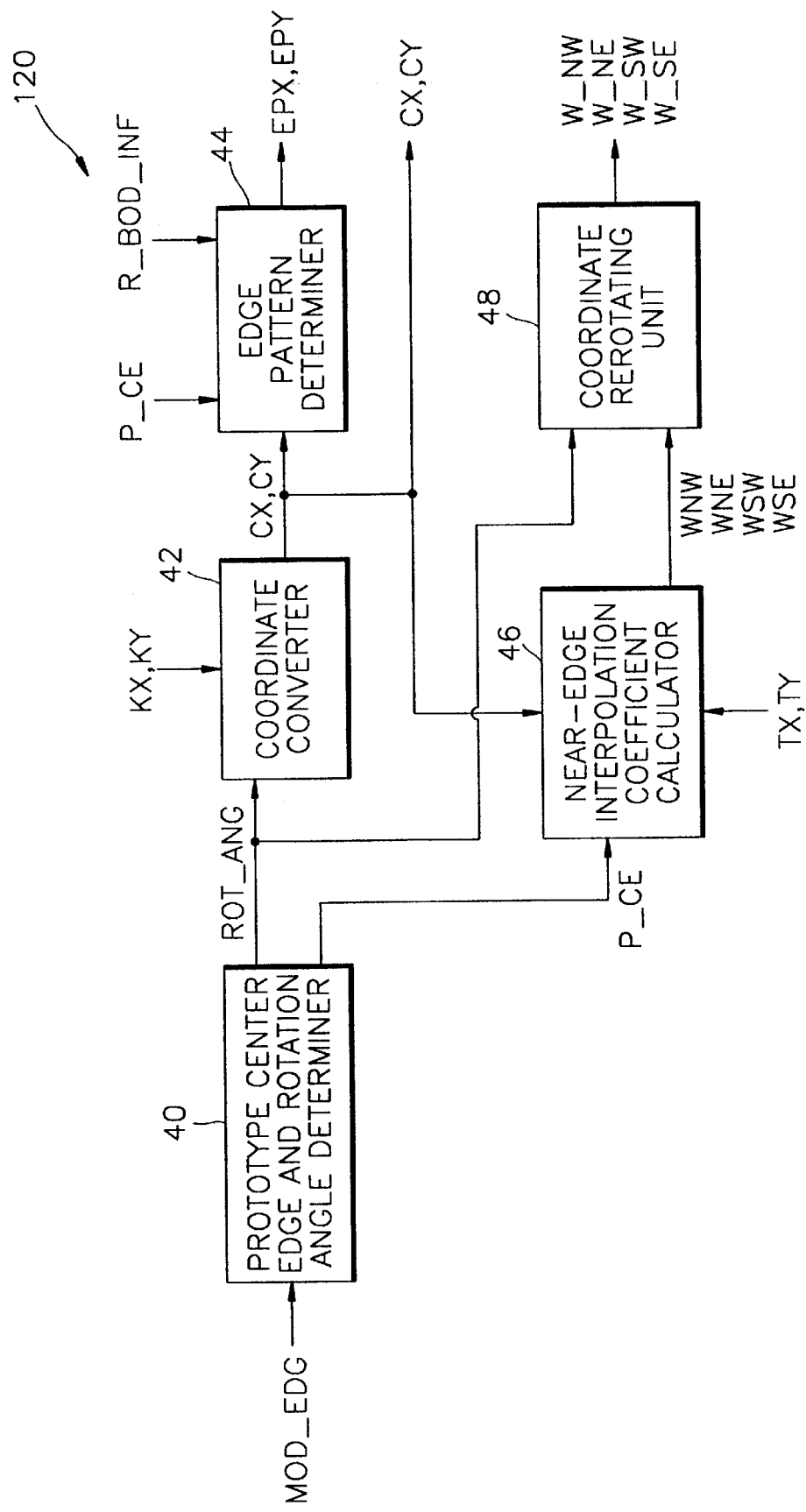
FIG. 4 is a block diagram illustrating the near-edge coefficient generator of FIG. 1.

FIG. 4 is a detailed block diagram illustrating the near-edge coefficient generator 120 of FIG. 1. Referring to FIG. 4, the near-edge coefficient generator 120 includes a prototype center edge and rotation angle determiner 40, a coordinate converter 42, an edge pattern determiner 44, a near-edge interpolation coefficient calculator 46 and a coordinate rerotating unit 48.

The prototype center edge and rotation angle determiner 40 receives the modified edge information MOD_EDG output from the edge direction modifier 110 and selects a prototype center edge P_CE. There may be 6 different prototype center edges. The prototype center edge and rotation angle determiner 40 also determines rotation angles ROT_ANG for respective prototype center edges P_CE. In other words, to represent various types of edges using only the 6 prototype center edges P_CE, the prototype center edge and rotation angle determiner 40 rotates an edge, which has the same shape as one of the prototype center edges P_CE but has a different angle, by a predetermined rotation angle. Specific examples will be described below with reference to FIGS. 5A through 5F.

The coordinate converter 42 converts the coordinates (KX, KY) of a current interpolation position according to the rotation angle ROT_ANG determined by the prototype center edge and rotation angle determiner 40 and outputs converted coordinates (CX, CY) of the interpolation position.

The edge pattern determiner 44 receives the converted interpolation position coordinates (CX, CY) and generates different types of edge patterns EPX and EPY in response to the prototype center edge P_CE and border edge information R_BOD_INF. The border edge information R_BOD_INF indicates edges which have been rotated according to the rotation angles ROT_ANG. Each of the edge patterns EPX and EPY may be, for example, single, twin or periodic horizontal, vertical or diagonal edges, which will be explained below. The edge patterns EPX and EPY are applied to the filter coefficient generator 140 of FIG. 1.

The near-edge interpolation coefficient calculator 46 performs an operation on the converted interpolation position coordinates (CX, CY) from the coordinate converter 42 and the 1-dimensional non-linear interpolation filter coefficients TX and TY from the filter coefficient generator 140 in response to the prototype center edge P_CE, and generates near-edge 2-dimensional non-linear interpolation coefficients WNW, WNE, WSW and WSE depending on the result of the operation.

The coordinate rerotating unit 48 rerotates the near-edge 2-dimensional non-linear interpolation coefficients WNW, WNE, WSW and WSE by the rotation angle ROT_ANG. In other words, an original interpolation position is rotated by a rotation angle, so the interpolation position coordinates are converted. The converted interpolation position is rotated by the rotation angle in an opposite direction to that of the previous rotation so that the original interpolation position is restored. The result of rerotating the near-edge 2-dimensional non-linear interpolation coefficients WNW, WNE, WSW and WSE by the rotation angle ROT_ANG is final 2-dimensional non-linear interpolation coefficients W_NW, W_NE, W_SW and W_SE.

With such operations, 2-dimensional non-linear interpolation coefficients W_NW, W_NE, W_SW and W_SE according to the present invention are generated.

FIGS. 5A through 5F are diagrams for explaining prototype center edges P_CE and rotation angles ROT_ANG generated by the prototype center edge and rotation angle determiner 40 of FIG. 4. Referring to FIGS. 5A through 5F, the prototype center edges P_CE include six types, i.e., a corner type, a perpendicular type, a full line, a cross bar, a half line and a diagonal type. Each prototype center edge P_CE can be represented using 3 bits, and a rotation angle ROT_ANG can be represented using 2 bits.

First, a corner type among the prototype center edges will be described with reference to FIG. 5A. A corner edge is represented by a digital value, 001. A type a1 at the leftmost of FIG. 5A illustrates the prototype center edge of the corner type. The rotation angle of the prototype center edge a1 is considered to be 0°. The prototype center edge a1 is represented by an 8-bit digital value, 1100_0000. When the other center edges a2, a3 and a4 in FIG. 5A are rotated by 90°, 180° and 270°, respectively, the prototype center edge a1 of the corner type is obtained. The center edges a2, a3 and a4 in FIG. 5A are represented by the digital values 1001_0000, 0011_0000 and 0110_0000, respectively.

FIG. 5B illustrates the prototype center edge of a perpendicular type. A perpendicular edge is represented by a digital value, 010. A type b1 at the leftmost of FIG. 5B illustrates the prototype center edge of the perpendicular type. The prototype center edge b1 is represented by an 8-bit digital value, 1110_0000. The rotation angle of the prototype center edge b1 is considered to be 0°. When the other center edges b2, b3 and b4 in FIG. 5B are rotated by 90°, 180° and 270°, respectively, the prototype center edge b1 of the perpendicular type is obtained. The center edges b2, b3 and b4 in FIG. 5B are represented by the 8-bit digital values 1101_0000, 1011_0000 and 0111_0000, respectively.

FIG. 5C illustrates the prototype center edge of a full line. A full line edge is represented by a digital value, 011. A type c1 at the leftmost of FIG. 5C illustrates the prototype center edge of the full line. The prototype center edge c1 of the full line is represented by an 8-bit digital value, 1010_0000. The rotation angle of the prototype center edge c1 is considered to be 0°. When the other center edge c2 in the right of FIG. 5C is rotated by 90°, the prototype center edge c1 of the full line is obtained. The center edge c2 is represented by an 8-bit digital value, 0101_0000. For the full line type, only two kinds of edges having 0° and 90° exist.

FIG. 5D illustrates the prototype center edge d1 of a cross bar. A cross bar edge is represented by a 3-bit digital value, 100. The cross bar is represented by only one center edge. In other words, in the case of the cross bar, there is no rotation angle. The prototype center edge of the cross bar is represented by an 8-bit digital value, 1111_0000.

FIG. 5E illustrates the prototype center edge of a half line. A half line edge is represented by a digital value, 101. A type e1 at the leftmost of FIG. 5E illustrates the prototype center edge of the half line. The prototype center edge e1 is represented by an 8-bit digital value, 1000_0000. The rotation angle of the prototype center edge e1 is considered to be 0°. When the other center edges e2, e3 and e4 in FIG. 5E are rotated by 90°, 180° and 270°, respectively, the prototype center edge e1 of the half line is obtained. The center edges e2, e3 and e4 in FIG. 5E are represented by the 8-bit digital values 0001_0000, 0010_0000 and 0100_0000, respectively.

FIG. 5F illustrates the prototype center edge of a diagonal type. A diagonal edge is represented by a digital value, 110. A type f1 at the leftmost of FIG. 5F illustrates the prototype center edge of the diagonal type. The prototype center edge f1 is represented by an 8-bit digital value, 0000_1000. The rotation angle of the prototype center edge f1 is considered to be 0°. When the other center edges f2, f3 and f4 in FIG. 5F are rotated by 90°, 180° and 270°, respectively, the prototype center edge f1 of the diagonal type is obtained. The center edges f2, f3 and f4 in FIG. 5F are represented by the 8-bit digital values 0000_0001, 0000_0010 and 0000_0100, respectively. Two diagonal edges f5 and f6 in FIG. 5F illustrate twin edges. In other words, the rotation angle of the diagonal edge f5 varies depending on the coordinates of an interpolation position on the x and y axes. When x+y exceeds 1, the rotation angle is 180°. When x+y is 1 or less, the rotation angle is 0°. The diagonal edge f5 is represented by a digital value, 0000_1010. Here, an outer diagonal line on the right side of the diagonal edge f5 is considered to be a border edge. For the diagonal edge f6, when x<y, the rotation angle is 270°, and when x≧y, the rotation angle is 90°. The diagonal edge f6 is represented by a digital value, 0000_0101.

Referring to FIGS. 5A through 5F, a single, twin or periodic edge type is determined depending on the existence or non-existance of border edges on the basis of the above 6 prototype center edges. In other words, when a border edge is absent, a single edge type is determined as a center edge type. When a border edge exists in on only one side of a prototype center edge, a twin edge type is determined as a center edge type in the direction of the side. When border edges exist on two sides, a periodic edge is determined as a center edge type.

Figure 6A:
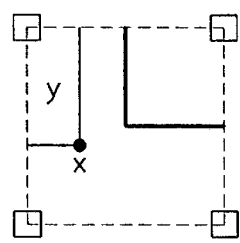
FIGS. 6A through 6B are diagrams for explaining the operation of the coordinate converter of FIG. 4.
Figure 6B:
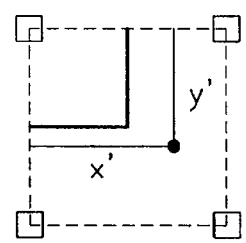

FIGS. 6A through 6B are diagrams for explaining the operation of the coordinate converter 42 of FIG. 4. FIG. 6A illustrates an interpolation position (KX, KY) before conversion, and FIG. 6B illustrates an interpolation position (CX, CY) obtained after conversion according to a rotation angle ROT_ANG. When rotation angles are determined for prototype center edges, an original interpolation position is converted together with a coordinate axis.

In FIG. 6A, it is assumed that the coordinates of an original interpolation position (KX, KY) are (x, y), and the coordinates of a converted interpolation position (CX, CY) are (x', y'). The coordinates (x, y) of FIG. 6A undergo conversion steps and are finally converted into (x', y') as shown in FIG. 6B. A conversion of coordinates such as that shown in FIGS. 6A and 6B occurs when the rotation angle is 90°. In other words, the coordinates (x, y) are converted into (X, Y), and (X, Y) are converted into (X', Y'). (X', Y') are converted into (x', y'). Here, X=x−0.5 and Y=y−0.5. It is assumed that the maximum value of the length of each of the x and y axes is 1. The values X' and Y' are obtained from the following equation.

$$\begin{bmatrix} X' \\ Y' \end{bmatrix} = \begin{bmatrix} \cos\theta & -\sin\theta \\ \sin\theta & \cos\theta \end{bmatrix} \begin{bmatrix} X \\ Y \end{bmatrix} \qquad (1)$$

Equation (1) can be rearranged as Equation (2), and the coordinate values x' and y' of a converted interpolation position can be obtained.

$$x' = X' + 0.5 = \qquad (2)$$
$$(\cos\theta X - \sin\theta Y) + 0.5 = \cos\theta x - \sin\theta y + (\sin\theta - \cos\theta + 1) * 0.5$$

$$y' = Y' + 0.5 =$$
$$(\sin\theta X + \cos\theta Y) + 0.5 = \sin\theta x + \cos\theta y + (1 - \sin\theta - \cos\theta) * 0.5$$

As described above, the coordinates (x', y') can be obtained from Equation (2). As a result, conversion of coordinates in response to rotation angles can be arranged as shown in Table 1.

TABLE 1

| Rotation angles | Converted Coordinates | |
| --- | --- | --- |
|  | x' | y' |
| 0° | x | y |
| 90° | y | 1 − x |
| 180° | 1 − x | 1 − y |
| 270° | 1 − y | x |

As shown in Table 1, a coordinate axis also moves depending on a rotation angle ROT_ANG in the present invention, so that coordinates resulting from 90° conversion and coordinates resulting from 270° conversion in a usual coordinate conversion are switched.

Figure 7:
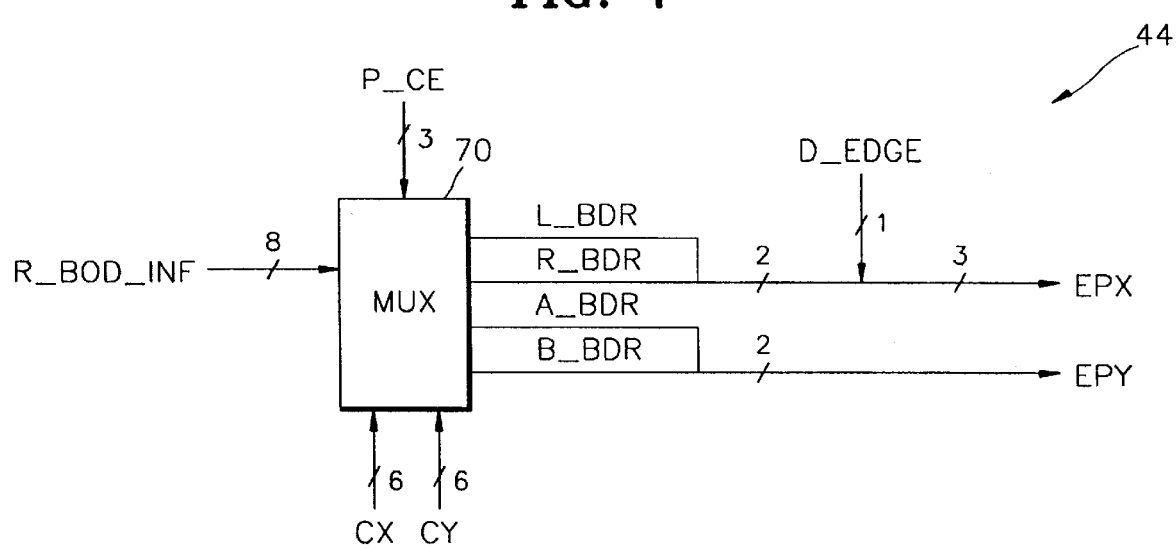
FIG. 7 is a detailed block diagram illustrating the edge pattern determiner of FIG. 4.

FIG. 7 is a detailed block diagram illustrating the edge pattern determiner 44 of the near-edge coefficient generator 120 of FIG. 4. Referring to FIG. 7, the edge pattern determiner 44 is realized as a multiplexer (MUX) 70.

The MUX 70 receives the bits of the border edge information R_BOD_INF as an input signal, receives the prototype center edge P_CE and the converted interpolation position (CX, CY) as selection signals, and determines edge patterns EPX and EPY. Here, the border edge information R_BOD_INF can be represented with 8 bits. As mentioned before, the prototype center edge P_CE is represented with 3 bits. In FIG. 7, it is assumed that the converted interpolation position (CX, CY) is represented with 6 bits. The output of the MUX 70 includes a left border edge L_BDR and right border edge R_BDR pair and an upper border edge A_BDR and lower border edge B_BDR pair, and each pair is represented with 2 bits. One bit indicating a diagonal edge D_EDGE is added to the horizontal pair of the right and left edges, so that a 3-bit edge pattern EPX is generated. Therefore, an edge pattern in a diagonal direction and an edge pattern in a horizontal direction can be simultaneously represented. When the most significant bit among these 3 bits is 1, the edge pattern EPX is a diagonal edge, and when the most significant bit is 0, the edge pattern EPX is a horizontal edge. When the remaining bits of the edge pattern EPX are 00, the edge pattern EPX is a single edge. When the remaining bits are 01, the edge pattern EPX is a twin right edge. When the remaining bits are 10, the edge pattern EPX is a twin left edge. When the remaining bits are 11, the edge pattern EPX is a periodic edge. The edge pattern EPY in a vertical direction is a coordinate of the Y axis and can be represented with 2 bits. In the same manner as applied to the edge pattern EPX, when the 2 bits are 00, the edge pattern EPY is a single edge. When the 2 bits are 10 or 01, the edge pattern EPY is a twin upper or lower edge. When the 2 bits are 11, the edge pattern EPY is a periodic edge.

Figure 8:
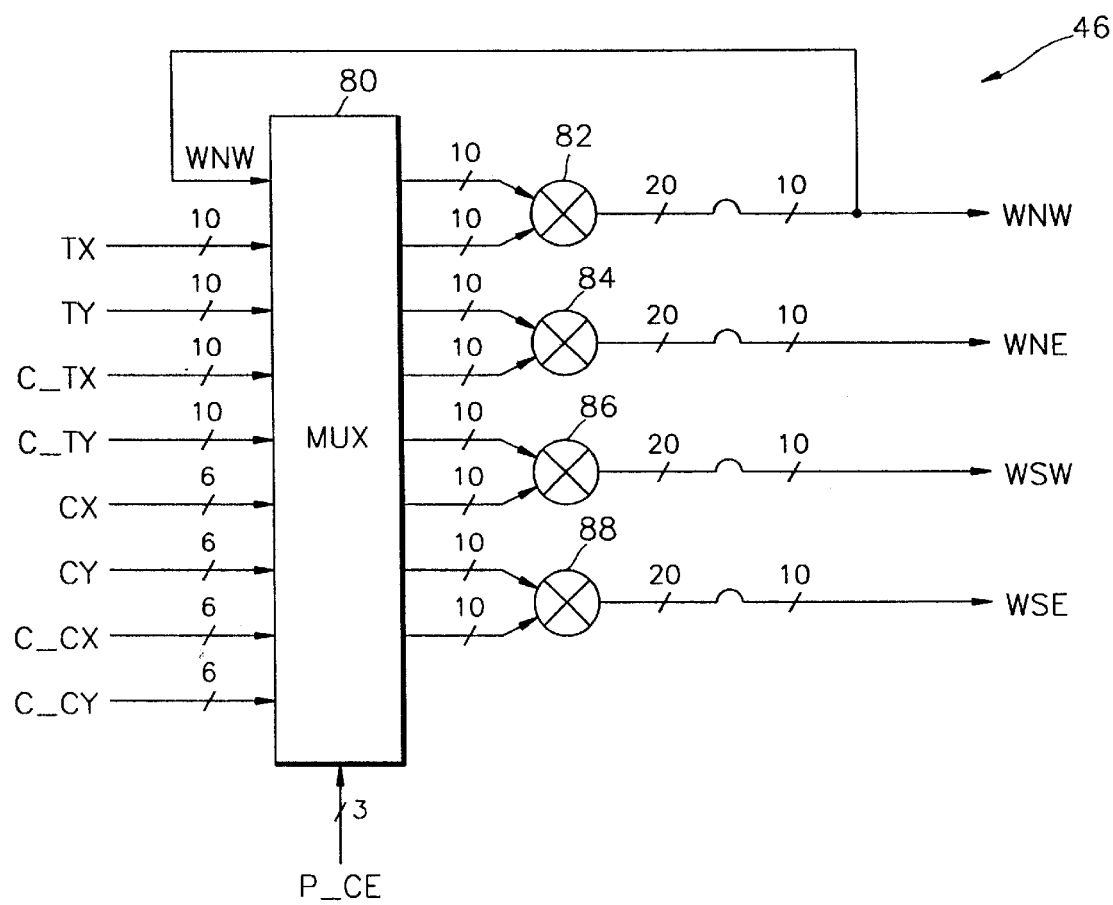
FIG. 8 is a detailed block diagram illustrating the near-edge interpolation coefficient calculator of FIG. 4.

FIG. 8 is a detailed block diagram illustrating the near-edge interpolation coefficient calculator 46 of FIG. 4. Referring to FIG. 4, the near-edge interpolation coefficient calculator 46 includes a MUX 80 and multipliers 82, 84, 86 and 88.

The MUX 80 receives the 1-dimensional non-linear interpolation filter coefficients TX and TY output from the filter coefficient generator 140, the converted interpolation position (CX, CY) from the coordinate converter 42, values C_CX, C_CY, C_TX and C_TY obtained by subtracting each of the coordinates CX, CY, TX and TY from 1, and a near-edge 2-dimensional interpolation coefficient WNW from the output of the multiplier 82. In FIG. 8, C_TX, C_TY, C_CX and C_CY indicate 1-TX, 1-TY, 1-CX and 1-CY, respectively. Each of the values TX, TY, C_TX and C_TY is represented with 10 bits. Each of the values CX, CY, C_CX and C_CY is represented with 6 bits. The MUX 80 receives the 3-bit prototype center edge P_CE as a selection signal and selectively outputs the above inputs in response to the 3-bit prototype center edge P_CE. Here, in this example, each of the data output from the MUX 80 is represented with 10 bits. In other words, the remaining bits other than 6 bits of a signal are occupied with zeros so that every output data can be represented with the same number of bits.

More specifically, the multiplier 82 multiplies TX by TY or C_CY and takes only the upper 10 bits of the 20-bit result of the multiplication, thereby generating a first near-edge 2-dimensional non-linear interpolation coefficient WNW. The multiplier 84 multiplies the first near-edge 2-dimensional non-linear interpolation coefficient WNW or the value C_TX by TY or C_CY and takes only the upper 10 bits of the 20-bit result of the multiplication, thereby generating a second near-edge 2-dimensional non-linear interpolation coefficient WNE. The multiplier 86 multiplies the first near-edge 2-dimensional non-linear interpolation coefficient WNW, TX or C_CX by C_TY or CY and takes the only upper 10 bits of the 20-bit result of the multiplication, thereby generating a third near-edge 2-dimensional non-linear interpolation coefficient WSW. The multiplier 88 multiplies the first near-edge 2-dimensional non-linear interpolation coefficient WNW, CX or C_TX by (CX+CY−1), CY or C_TY and takes only the upper 10 bits of the 20-bit result of the multiplication, thereby generating a fourth near-edge 2-dimensional non-linear interpolation coefficient WSE. The near-edge 2-dimensional non-linear interpolation coefficients WNW, WNE, WSW and WSE generated through the above operations are 2-dimensional interpolation coefficients. Their coordinate values are rerotated by the rotation angle, and thus output as final 2-dimensional non-linear interpolation coefficients W_NW, W_NE, W_SW and W_SE.

Procedures for generating the near-edge 2-dimensional non-linear interpolation coefficients WNW, WNE, WSW and WSE will be described in detail with reference to FIGS. 9A through 9F. FIG. 9A illustrates calculation procedures for generating the near-edge 2-dimensional interpolation coefficients WNW, WNE, WSW and WSE with respect to a prototype center edge of a corner type. As shown in FIG. 9A, four adjacent pixels in all directions are represented by NW, SW, NE and SE, respectively. A horizontal coordinate and a vertical coordinate, which are set considering the coordinates of current positions of the pixels, are represented by CX and CY, respectively. These coordinates (CX, CY) are the coordinates of a converted interpolation position. Here, an arbitrary interpolation position Z as a parameter designated by coordinates CX and CY can be expressed as Equation (3).

$$Z=(SW-SE)(C\_CX)+(NE-SE)*C\_CY+SE \qquad (3)$$

Referring to FIG. 9A illustrating the case of the prototype center edge of a corner type, the coefficient WNW is obtained from TX*TY. The arbitrary interpolation position Z can also be expressed as Equation (4) from Equation (3).

$$W=WNW*NW+(1-WNW)*Z=WNW*NW+(1-WNW)[(C\_CX)*SW+ \\ (C\_CY)*NE+(CX+CY-1)*SE] \qquad (4)$$

Accordingly, weights W, i.e., the near-edge 2-dimensional non-linear coefficients WNW, WNE, WSE and WSW, by which the peripheral pixels NW, SW, NE and SE of the interpolation position Z are multiplied can be obtained from Equation (4). Here, WNE is obtained from (1−WNW)*C_CY, WSW is obtained from (1−WNW)*C_CX, and WSE is obtained from (1−WNW)*(CX+CY−1).

FIGS. 9B through 9F show procedures for calculating near-edge 2-dimensional non-linear interpolation coefficients with respect to the prototype center edges other than the corner prototype center edge. In FIGS. 9A through 9F, it is assumed that decision functions for individual coefficients x and y are independent. As compared to the corner prototype center edge of FIG. 9A, in the case of the prototype center edge of a half line shown in FIG. 9E, information on positions A and B can be expressed as Equation (5).

$$A = TX * NW + (1 - TX) * NE \qquad (5)$$

$$B = C\_CX * SW + CX * SE$$

Accordingly, the interpolation position Z as a parameter set considering the positions A and B can be expressed as Equation (6).

$$Z=CY*C\_CX*SW+CY*CX*SE+C\_CX*TX*NW+C\_CY*C\_TX*NE \quad (6)$$

In the case of a diagonal prototype center edge shown in FIG. 9F, it is determined whether the sum of CX and CY exceeds 1, or not, and the coefficients WNW, WNE, WSW and WSE are calculated depending on the determination. For example, when the sum of CX and CY exceeds 1, the coefficient WNW is set to 0. When the sum does not exceed 1, the coefficient WNW is set to T(X+Y). The remaining coefficients are calculated as shown in FIG. 9F.

Figure 10:
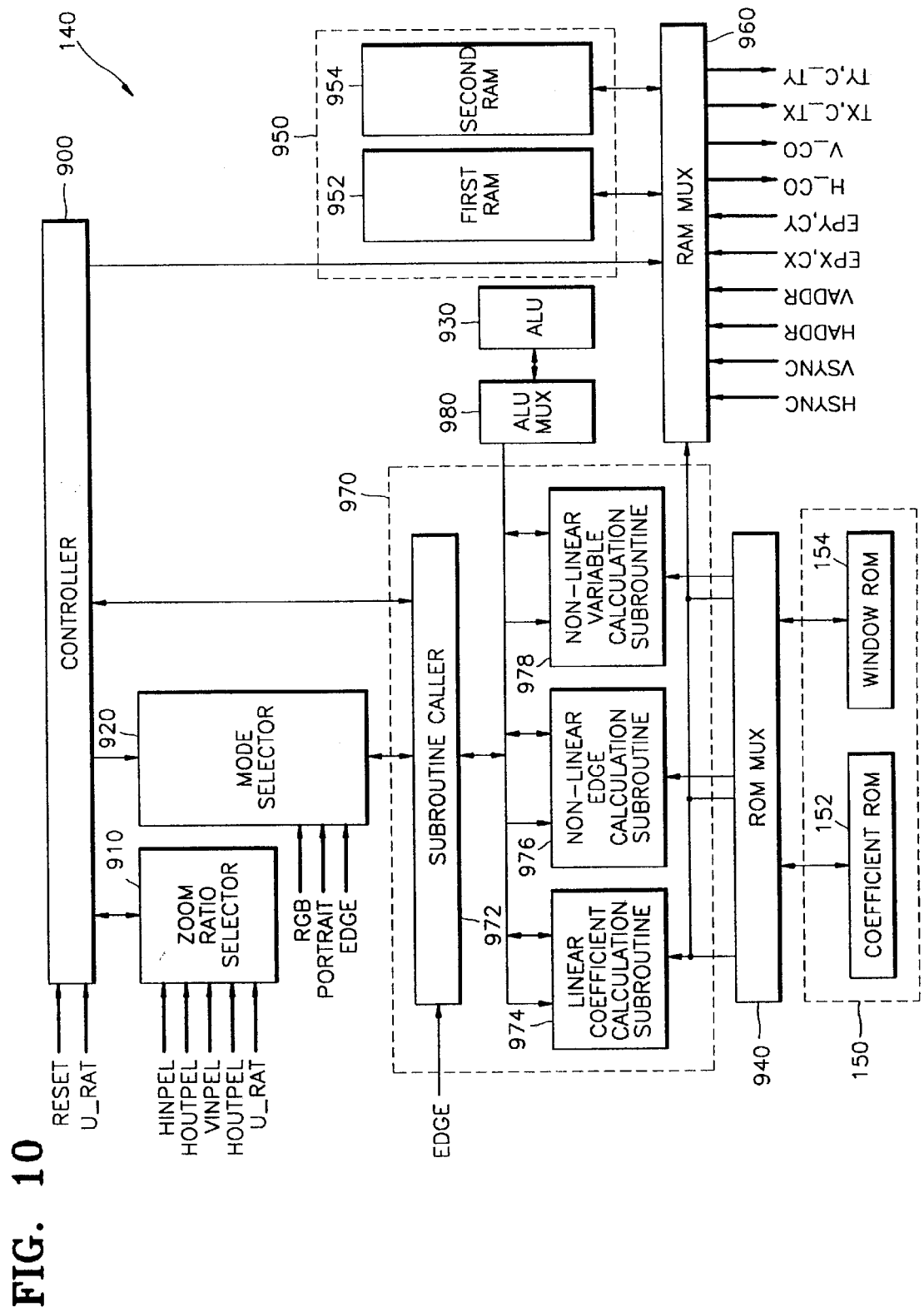
FIG. 10 is a detailed block diagram illustrating the filter coefficient generator of FIG. 1.

FIG. 10 is a detailed block diagram illustrating the filter coefficient generator 140 of FIG. 1. The filter coefficient generator 140 includes a controller 900, a zoom ratio selector 910, a mode selector 920, a subroutine processor 970, a ROM MUX 940, an arithmetic logic unit (ALU) 930, a memory block 950, a random access memory (RAM) MUX 960 and an ALU MUX 980. For clarity of the description, the look-up table 150 is illustrated together with the coefficient generator 140.

Referring to FIG. 10, the controller 900 is reset in response to a reset signal RESET and controls overall processes such as processing on the subroutines and the operations of the memory block 950 according to a zoom ratio U_RAT selected by a user.

When a zooming function is performed, the zoom ratio selector 910 sets a zoom ratio for magnifying a screen in response to a horizontal input size HINPEL, a horizontal output size HOUTPEL, a vertical input size VINPEL, a vertical output size VOUTPEL and the zoom ratio U_RAT input by the user.

The mode selector 920 determines a video output mode in response to video mode selection signals applied from the outside under the control of the controller 900. The video mode selection signals are RGB information RGB, portrait mode information PORTRAIT and edge information EDGE. In the present invention, non-linear interpolation or linear interpolation is selected depending on the edge information EDGE.

When the zooming function for magnifying a screen is performed, the subroutine processor 970 determines whether to process a subroutine related to linear interpolation or a subroutine related to non-linear interpolation depending on the edge information EDGE. The subroutine processor 970 also calls a subroutine corresponding to the result of the determination and processes it. For these operations, the subroutine processor 970 includes a subroutine caller 972, a linear coefficient calculation subroutine 974, a non-linear edge calculation subroutine 976 and a non-linear variable calculation subroutine 978.

More specifically, the subroutine caller 972 calls a corresponding subroutine according to the edge information EDGE applied from the outside and the video output mode selected by the mode selector 920. For example, linear interpolation will be performed on a portion in which edge information does not exist, so the linear coefficient calculation subroutine 974 is executed. The linear coefficient calculation subroutine 974 is a program routine for calculating filter coefficients necessary for linear interpolation and is loaded with necessary 1-dimensional coefficients from the look-up table 150. The subroutine caller 972 calls and operates the non-linear edge calculation subroutine 976 and the non-linear variable calculation subroutine 978 for an edge portion in a video signal. Here, the non-linear edge calculation subroutine 976 calculates edges among pixels and calculates convolution values among the pixels depending on the calculated edges using the 1-dimensional filter coefficients stored in the look-up table 150. The non-linear variable calculation subroutine 978 calculates necessary variables depending on the zoom ratio during non-linear interpolation. The non-linear variable calculation subroutine 978 uses the 1-dimensional filter coefficients stored in the look-up table 150, when necessary. As described above, each of the subroutines 974, 976 and 978 uses the ALU 930 through the ALU MUX 980 for performing arithmetic and logic operations.

Referring to FIG. 10, the look-up table 150 is composed of two ROMs, a coefficient ROM 152 and a window ROM 154. The coefficient ROM 152 stores the 1-dimensional filter coefficients, and the window ROM 154 stores window coefficients. Here, the filter coefficients and the window coefficients can be applied to the subroutine processor 970 or the memory block 950 through the ROM MUX 940.

The results of the operations of the subroutine processor 970 are stored in the memory block 950. The memory block 950 is composed of a first RAM 952 and a second RAM 954. The first RAM 952 stores filter interpolation coefficients calculated depending on a zoom ratio during linear interpolation. As described above, interpolation coefficients change depending on a zoom ratio selected by a user in the case of linear interpolation. The changing coefficients are stored in the first RAM 952. The second RAM 954 stores 1-dimensional filter interpolation coefficients calculated based on a filter type, a zoom ratio or an edge type during non-linear interpolation. Here, the 1-dimensional filter interpolation coefficients can be calculated by a sinc function or a cubic spline function.

The RAM MUX 960 receives horizontal and vertical sync signals HSYNC and VSYNC from the outside and transmits them to the memory block 950 for synchronization of a video signal. The RAM MUX 960 also receives as addresses horizontal and vertical addresses HADDR and VADDR, converted interpolation position values CX and CY generated by the coordinate converter 42 of FIG. 4, and edge patterns EPX and EPY output from the edge pattern determiner 44 of FIG. 4 and transmits them to the memory block 950. The horizontal and vertical addresses HADDR and VADDR are applied to the first RAM 952 as addresses for linear interpolation. For example, the size of each of the horizontal and vertical addresses HADDR and VADDR can be 5 bits. Here, the first RAM 952 outputs 1-dimensional linear interpolation coefficients H_CO and V_CO in response to the horizontal and vertical addresses HADDR and VADDR. The second RAM 954 receives the converted interpolation position values CX and CY and the edge patterns EPX and EPY as addresses and generates 1-dimensional non-linear interpolation filter coefficients TX and TY or C_TX and C_TY.

Figure 11:
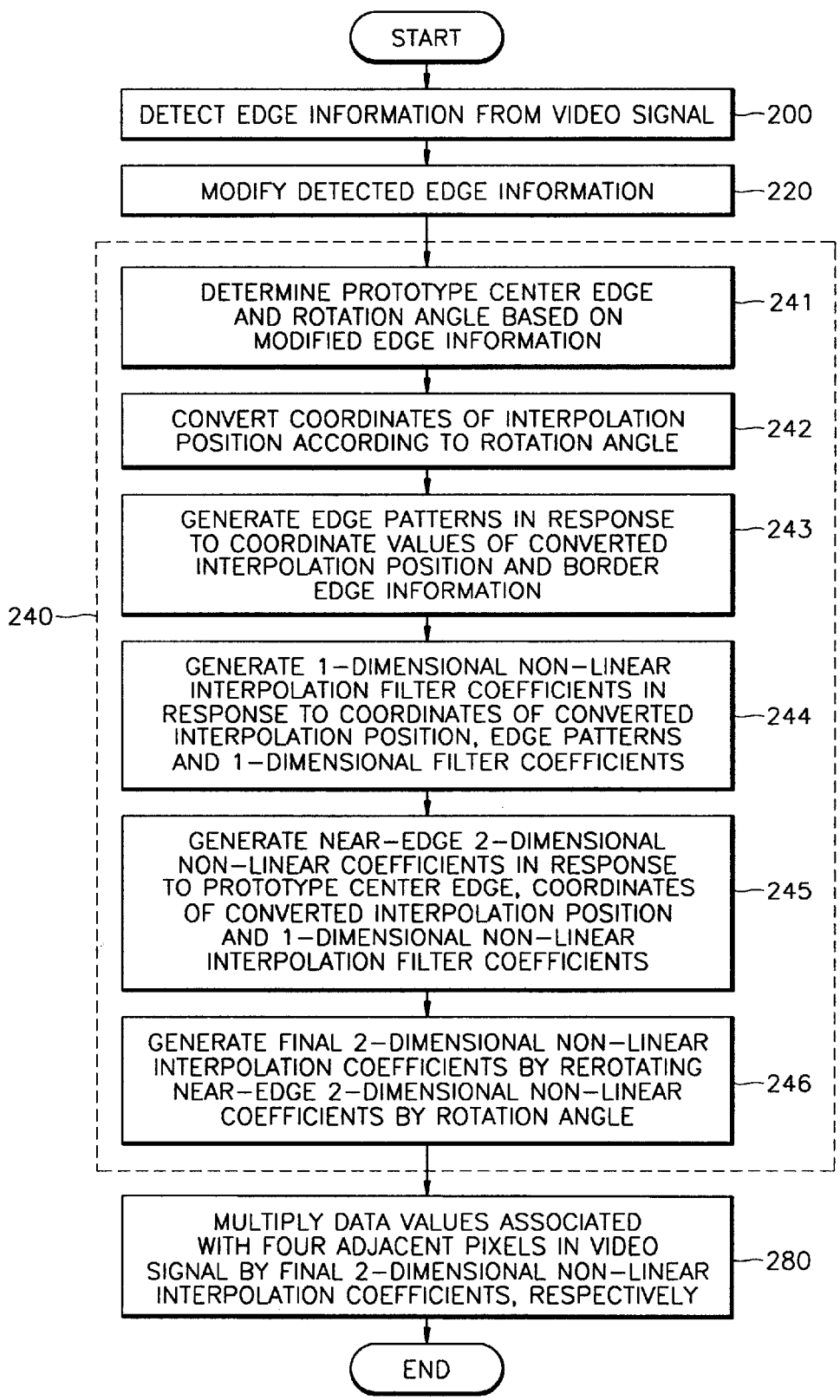
FIG. 11 is a flowchart illustrating a 2-dimensional non-linear interpolation method according to an embodiment of the present invention.

FIG. 11 is a flowchart illustrating a 2-dimensional non-linear interpolation method according to an embodiment of the present invention. A 2-dimensional non-linear interpolation method according to an embodiment of the present invention will be described in detail with reference to FIGS. 1 through 11.

In step 200, the edge detector 100 of FIG. 1 detects edge information from a video signal. In step 220, the detected edge information is input into the edge direction modifier 110 and modified into a border edge and a center edge. As described above, the center edge includes horizontal, vertical and diagonal components.

In step 240, the near-edge coefficient generator 120 generates 2-dimensional non-linear interpolation coefficients W_NW, W_NE, W_SW and W_SE in response to the modified edge information MOD_EDG and 1-dimensional non-linear interpolation filter coefficients TX and TY. More specifically, in step 241, the prototype center edge and rotation angle determiner 40 in the near-edge coefficient generator 120 determines a prototype center edge P_CE and a rotation angle ROT_ANG corresponding to the prototype center edge P_CE based on the modified edge information MOD_EDG. In step 242, the coordinate converter 42 converts the coordinates (KX, KY) of a current interpolation position according to the determined rotation angle ROT_ANG. Here, the coordinates (CX, CY) of a converted interpolation position are obtained.

In step 243, the edge pattern determiner 44 generates different types of edge patterns EPX and EPY in response to the prototype center edge P_CE and border edge information R_BOD_INF. In step 244, the filter coefficient generator 140 generates 1-dimensional non-linear interpolation filter coefficients TX and TY in response to the edge patterns EPX and EPY, the coordinates (CX, CY) of the converted interpolation position and predetermined 1-dimensional filter coefficients. In step 245, the near-edge interpolation coefficient calculator 46 generates near-edge 2-dimensional non-linear interpolation coefficients WNW, WNE, WSW and WSE in response to the prototype center edge P_CE, the coordinates (CX, CY) of the converted interpolation position and the 1-dimensional non-linear interpolation filter coefficients TX and TY. In step 246, the coordinate rerotating unit 48 rerotates the near-edge 2-dimensional non-linear interpolation coefficients WNW, WNE, WSW and WSE by the rotation angle and generates final 2-dimensional non-linear interpolation coefficients W_NW, W_NE, W_SW and W_SE.

In step 280, the non-linear interpolation unit 130 multiplies four adjacent pixels of the interpolation position by the final 2-dimensional non-linear interpolation coefficients W_NW, W_NE, W_SW and W_SE, respectively, thereby non-linearly interpolating a video signal near an edge.

With such operations, a 2-dimensional non-linear video interpolation system according to the present invention performs video interpolation. In other words, in the present invention, interpolation for a portion including an edge in an image is performed considering 8 directions, that is, upper, lower, right, left and diagonal directions, thereby achieving optimal interpolation near the edge.

A 2-dimensional mixing interpolation system according to the present invention will be described with reference to the attached drawings.

Figure 12:
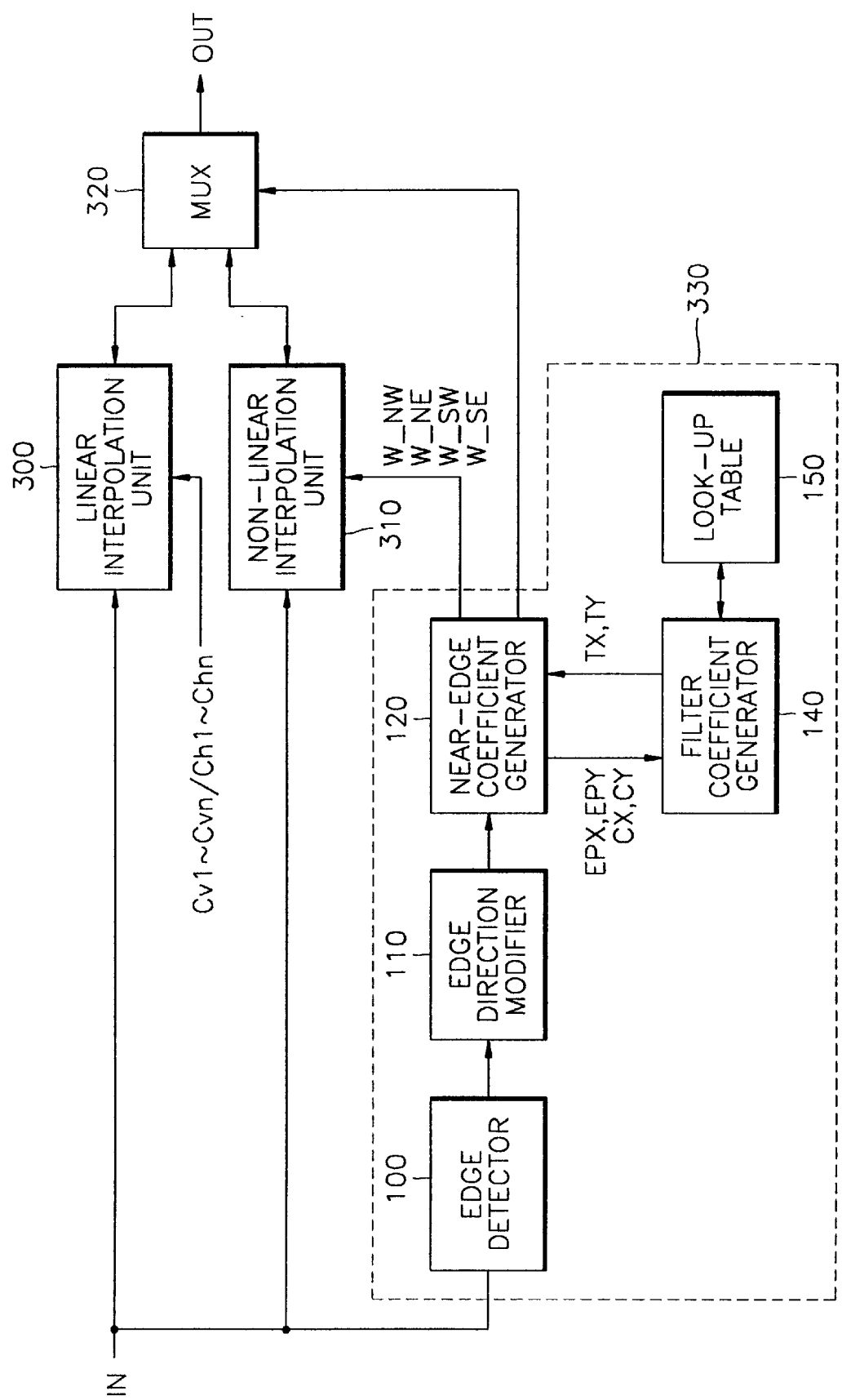
FIG. 12 is a block diagram illustrating a 2-dimensional mixing interpolation system according to an embodiment to which the 2-dimensional non-linear interpolation system of FIG. 1 is applied.

FIG. 12 is a block diagram illustrating a 2-dimensional mixing interpolation system according to an embodiment to which the 2-dimensional non-linear interpolation system of FIG. 1 is applied. The 2-dimensional mixing interpolation system according to the present invention includes an edge detection and non-linear interpolation coefficient generation unit 330, a linear interpolation unit 300, a non-linear interpolation unit 310 and a MUX 320. The edge detection and non-linear interpolation coefficient generation unit 330 and the non-linear interpolation unit 310 in FIG. 12 constitute the 2-dimensional non-linear interpolation system of FIG. 1. Thus, the members of the edge detection and non-linear interpolation coefficient generation unit 330 are represented by the same reference numerals as those of the members of FIG. 1.

Referring to FIG. 12, the edge detection and non-linear interpolation coefficient generation unit 330 detects edge information among pixels from an input video signal and obtains 2-dimensional non-linear interpolation coefficients W_NW, W_NE, W_SW and W_SE based on the detected edge information. The edge detection and non-linear interpolation coefficient generation unit 330 generates an edge signal EDG indicating the absence or existence of an edge among the plurality of adjacent pixels around the pixel to be interpolated. The members of the edge detection and non-linear interpolation coefficient generation unit 330 have been fully described in FIG. 1, and thus detailed descriptions thereof will be omitted.

The linear interpolation unit 300 performs n-tap 2-dimensional linear interpolation using n*n pixels around a pixel to be interpolated. For example, the linear interpolation unit 300 performs linear interpolation in a vertical direction using vertical linear interpolation coefficients Cv1–Cvn. Then, the linear interpolation unit 300 performs linear interpolation in a horizontal direction using horizontal linear interpolation coefficients Ch1–Chn, thereby finally outputting a linearly interpolated pixel.

The non-linear interpolation unit 310 multiplies four adjacent pixels around the pixel to be interpolated by the 2-dimensional non-linear interpolation coefficients W_NW, W_NE, W_SW and W_SE, respectively, thereby performing non-linear interpolation on the pixel to be interpolated. A detailed description thereof was provided with reference to FIG. 1.

The MUX 320 selects either the linearly interpolated pixels generated by the linear interpolation unit 300 or the non-linearly interpolated pixels generated by the non-linear interpolation unit 310 in response to edge information generated by the edge detection and non-linear interpolation coefficient generation unit 330. In other words, the MUX 320 selects the non-linearly interpolated pixels when an edge exists near the pixel to be interpolated, selects the linearly interpolated pixels when an edge does not exist near the pixel to be interpolated, and outputs the selected pixel to an output terminal OUT.

As described above, the 2-dimensional mixing interpolation system provided to improve the resolution of edges according to the present invention performs 2-dimensional linear interpolation on an area from which a graphic edge is not detected using the linear interpolation unit 300 in response to the edge signal EDG, and performs non-linear interpolation on an area from which a graphic edge is detected using the non-linear interpolation unit 310 according to the type of edge. Accordingly, even if an image is magnified, the shape of a graphic edge is maintained, thereby preventing picture quality from being degraded due to magnification of an image.

Figure 13:
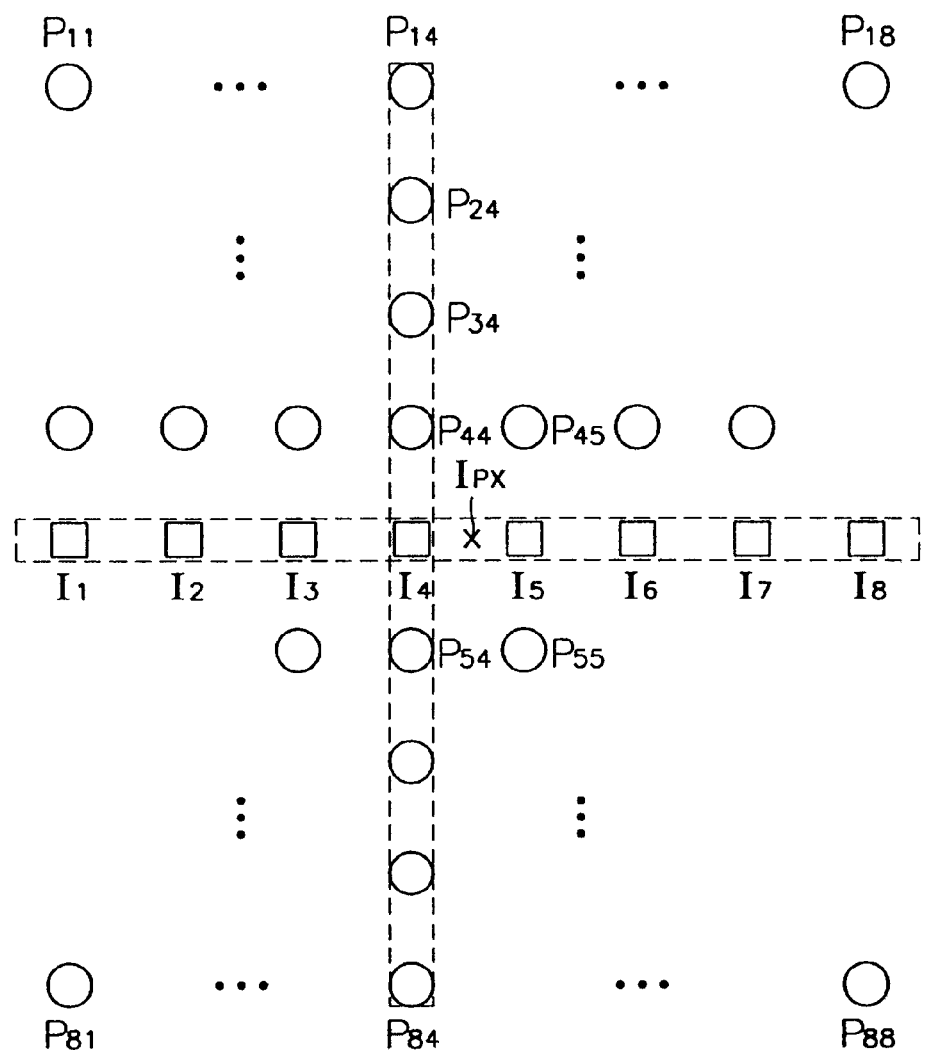
FIG. 13 is a diagram for illustrating 2-dimensional linear interpolation and non-linear interpolation performed by the linear interpolation unit and the non-linear interpolation unit of FIG. 12.

FIG. 13 is a diagram for explaining the 2-dimensional linear interpolation and the non-linear interpolation performed by the linear interpolation unit 300 and the non-linear interpolation unit 310, respectively, of FIG. 12. For clarity of the description, 8-tap 2-dimensional linear interpolation will be described with reference to FIG. 13.

Referring to FIG. 13, during the 2-dimensional linear interpolation, linear interpolation is performed in a vertical direction using 8*8 pixels P11–P88 around a pixel Ipx to be interpolated, thereby generating interpolated pixels I1–I8 in the vertical direction. Thereafter, linear interpolation is performed in a horizontal direction using the 8 vertically interpolated pixels I1–I8, thereby finally obtaining a linearly interpolated pixel Ipx. In addition, during near-edge interpolation, that is, the non-linear interpolation, four pixels P44, P54, P45 and P55 around the pixel Ipx to be interpolated are multiplied by 2-dimensional non-linear interpolation coefficients W_NW, W_NE, W_SW and W_SE, thereby obtaining a non-linearly interpolated pixel Ipx.

Figure 14:
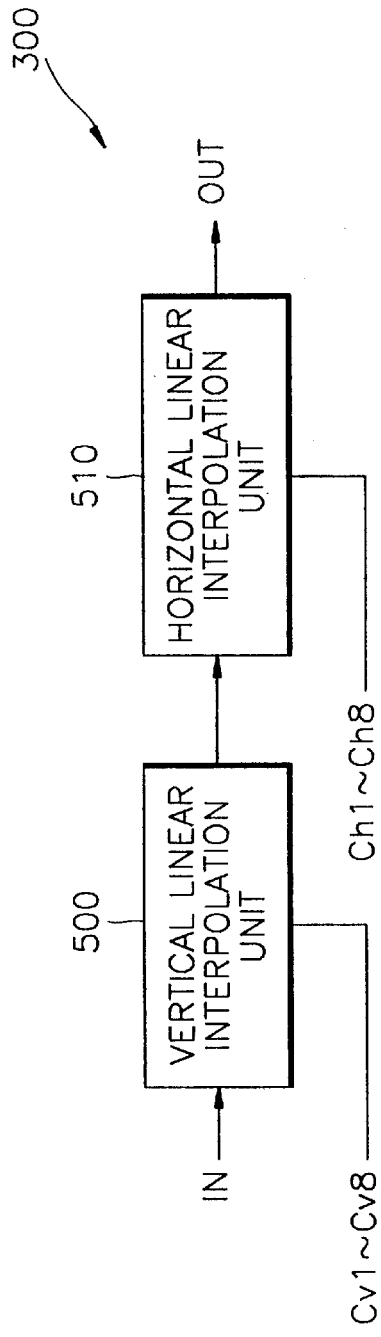
FIG. 14 is a block diagram illustrating the linear interpolation unit of FIG. 12.

FIG. 14 is a block diagram illustrating the linear interpolation unit 300 of FIG. 12. Referring to FIG. 14, the linear interpolation unit 300 includes a vertical linear interpolation unit 500 and a horizontal linear interpolation unit 510.

Referring to FIGS. 13 and 14, the vertical linear interpolation unit 500 performs vertical linear interpolation on 8 individual columns of pixels P11–P81, P12–P82, . . . , and P18–P88 using vertical linear interpolation coefficients Cv1–Cv8, thereby generating vertically interpolated pixels I1–I8. The horizontal linear interpolation unit 510 performs horizontal linear interpolation using the 8 vertically interpolated pixels I1–I8 and horizontal linear interpolation coefficients Ch1–Ch8, thereby finally obtaining a linearly interpolated pixel Ipx. The horizontal linear interpolation unit 510 outputs the linearly interpolated pixel Ipx to an output terminal OUT.

Figure 15:
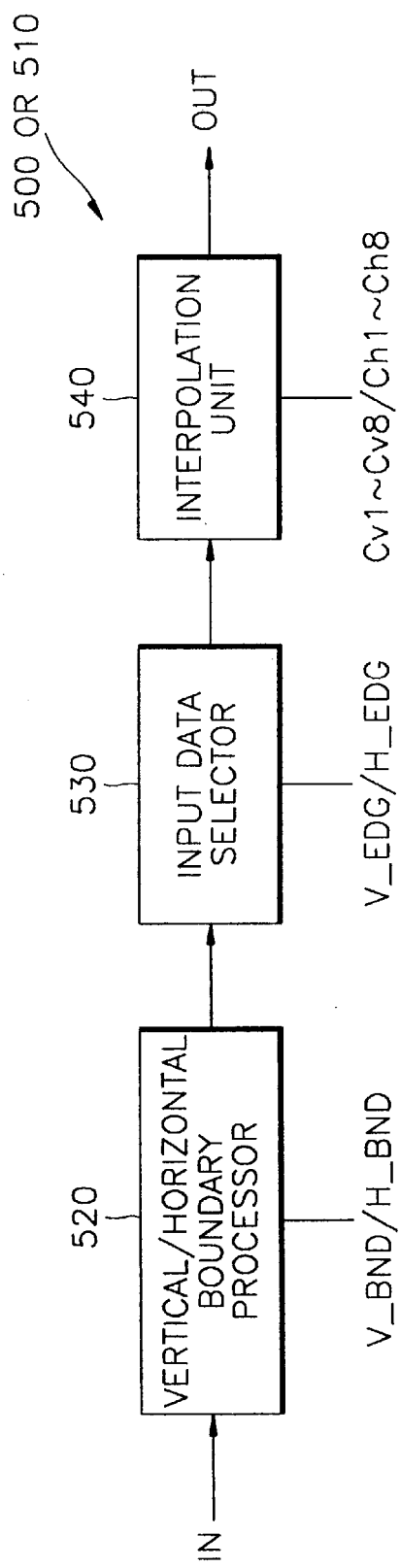
FIG. 15 is a block diagram illustrating the vertical/horizontal linear interpolation unit of FIG. 14.

FIG. 15 is a block diagram illustrating the vertical/horizontal linear interpolation unit 500 or 510 of FIG. 14. Referring to FIG. 15, the vertical/horizontal linear interpolation unit 500 or 510 includes a vertical/horizontal boundary processor 520, an input data selector 530 and an interpolation unit 540.

Referring to FIG. 15, when the vertical/horizontal boundary of a screen exists near a pixel to be interpolated, the vertical/horizontal boundary processor 520 copies pixels adjacent to the vertical/horizontal boundary in response to vertical/horizontal boundary information V_BND/H_BND of the screen, and generates and outputs 8 pixels used for linear interpolation.

When an edge exists among the pixels used for linear interpolation, the input data selector 530 processes the pixels in response to vertical/horizontal edge information V_EDG/H_EDG. For example, in FIG. 13, when the pixel I4 is to be interpolated, and an edge exists between the pixels P44 and P34, the input data selector 530 does not use all the 8 pixels P14–P84 on the vertical line of the pixel I4 as they are. In other words, the pixels P14–P34, among which an image rapidly changes due to the edge between the pixels P44 and P34, are not used. Instead, the pixel P44 adjacent to the edge is copied into the positions of the pixels P14–P34, and the copied pixels are used for linear interpolation.

The interpolation unit 540 performs linear interpolation by multiplying the 8 pixels output from the input data selector 530 by the vertical/horizontal linear interpolation coefficients Cv1–Cv8/Ch1–Ch8 and outputs the result of the linear interpolation to an output terminal OUT.

Figure 16:
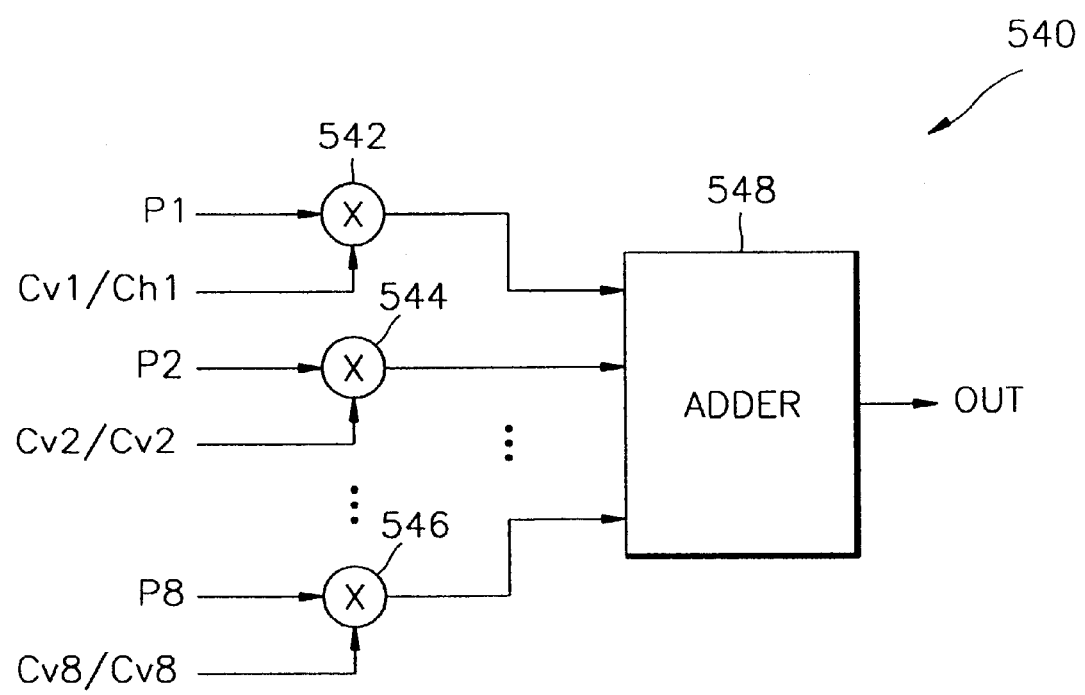
FIG. 16 is a detailed circuit diagram illustrating the interpolation unit of FIG. 15.

FIG. 16 is a detailed circuit diagram illustrating the interpolation unit 540 of FIG. 15. Referring to FIG. 16, the interpolation unit 540 includes 8 multipliers 542, 544, . . . and 546 and an adder 548. In FIG. 16, eight pixels P1–P8 and eight vertical/horizontal linear interpolation coefficients Cv1–Cv8/Ch1–Ch8, which are used for linear interpolation, are input to the eight multipliers 542–546, respectively. Each of the multipliers 542–546 multiplies an input pixel by an input interpolation coefficient and outputs the result of the multiplication to the adder 548. The adder 548 sums up the outputs from the eight multipliers 542–546 and finally outputs vertically/horizontally interpolated pixels to an output terminal OUT.

Figure 17:
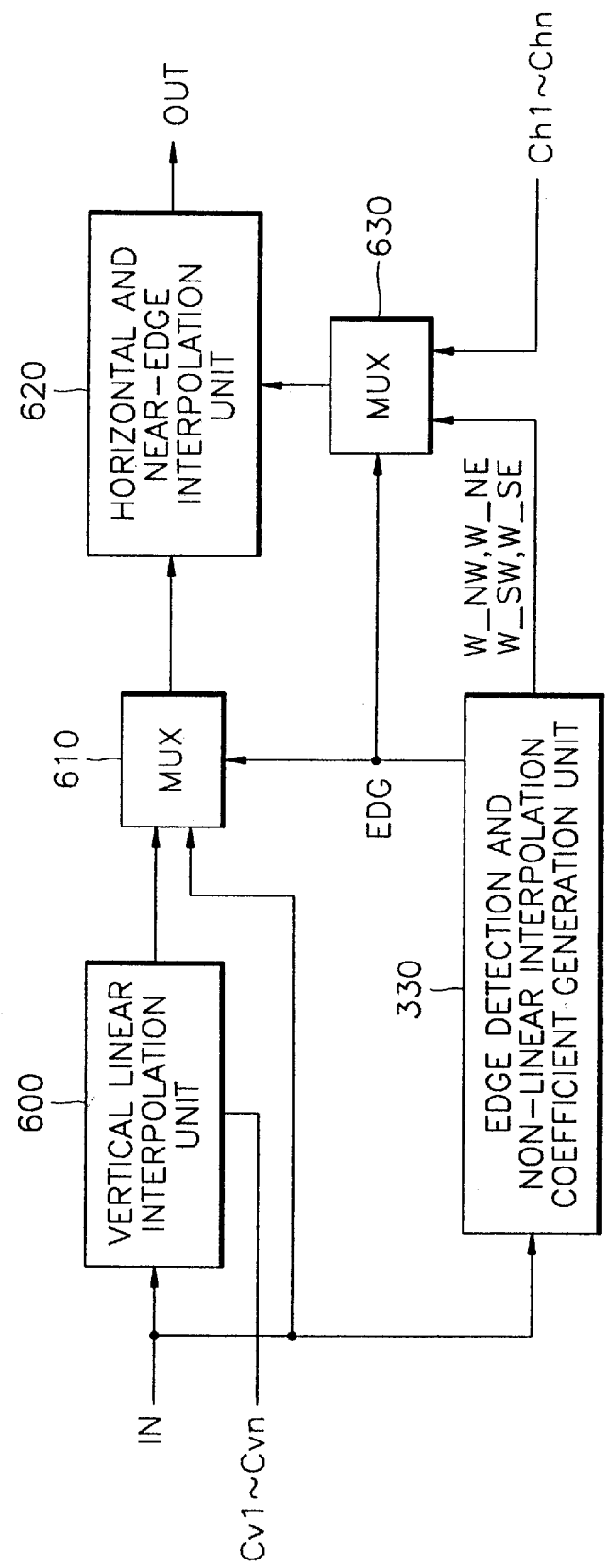
FIG. 17 is a block diagram illustrating a 2-dimensional mixing interpolation system according to another embodiment to which the 2-dimensional non-linear interpolation system of FIG. 1 is applied.

FIG. 17 is a block diagram illustrating a 2-dimensional mixing interpolation system according to another embodiment. The 2-dimensional mixing interpolation system includes an edge detection and non-linear interpolation coefficient generation unit 330, a vertical linear interpolation unit 600, a first MUX 610, a horizontal and near-edge interpolation unit 620, and a second MUX 630. The edge detection and non-linear interpolation coefficient generation unit 330 in FIG. 17 is the same as that of FIG. 12, and thus same reference numeral is used and detailed descriptions of the structure and operations thereof will be omitted.

The vertical linear interpolation unit 600 performs vertical linear interpolation using n*n pixels around a pixel to be interpolated and a plurality of vertical linear interpolation coefficients Cv1-Cvn. For example, referring to FIG. 13, the vertical linear interpolation unit 600 performs vertical linear interpolation using the 8*8 pixels P11–P88 and the vertical linear interpolation coefficients Cv1–Cv8 and generates vertically interpolated pixels I1–I8.

The first MUX 610 selects the vertically interpolated pixels output from the vertical linear interpolation unit 600 or four pixels PNE, PNW, PSE and PSW around the pixel to be interpolated and outputs the selected pixels, in response to edge signal EDG. In other words, when an edge exists near the pixel to be interpolated, the first MUX 610 selects and outputs the four pixels PNE, PNW, PSE and PSW around the pixel to be interpolated. When an edge does not exist near the pixel to be interpolated, the first MUX 610 selects and outputs the vertically interpolated pixels output from the vertical linear interpolation unit 600.

The second MUX 630 selectively outputs a plurality of horizontal interpolation coefficients Ch1–Chn or 2-dimensional non-linear interpolation coefficients W_NW, W_NE, W_SW and W_SE in response to the edge signal EDG. In other words, when an edge exists near the pixel to be interpolated, the second MUX 630 selects and outputs the 2-dimensional non-linear interpolation coefficients W_NW, W_NE, W_SW and W_SE generated by the edge detection and non-linear interpolation coefficient generation unit 330. On the other hand, when there is no edge near the pixel to be interpolated, the second MUX 630 selects and outputs the horizontal interpolation coefficients Ch1–Chn.

The horizontal and near-edge interpolation unit 620 multiplies the pixels selected and output by the first MUX 610 by the interpolation coefficients selected and output by the second MUX 630 and outputs an interpolated pixel through an output terminal OUT. For example, when an edge exists near the pixel to be interpolated, the horizontal and near-edge interpolation unit 620 receives the four pixels PNE, PNW, PSE and PSW around the pixel to be interpolated and the plurality of 2-dimensional non-linear interpolation coefficients W_NW, W_NE, W_SW and W_SE and performs non-linear interpolation. On the other hand, when there is no edge near the pixel to be interpolated, the horizontal and near-edge interpolation unit 620 receives the vertically interpolated pixels output from the first MUX 610 and the horizontal interpolation coefficients Ch1–Chn and performs horizontal linear interpolation.

As described above, interpolation is achieved by multiplying pixels used for interpolation by respective interpolation coefficients and adding the results of the multiplication. In other words, multipliers and an adder are required for performing interpolation. In this embodiment of the present invention, multipliers and adders required for interpolation can be commonly used for both horizontal linear interpolation and non-linear interpolation, so that the structure of a circuit can be simplified.

Figure 18:
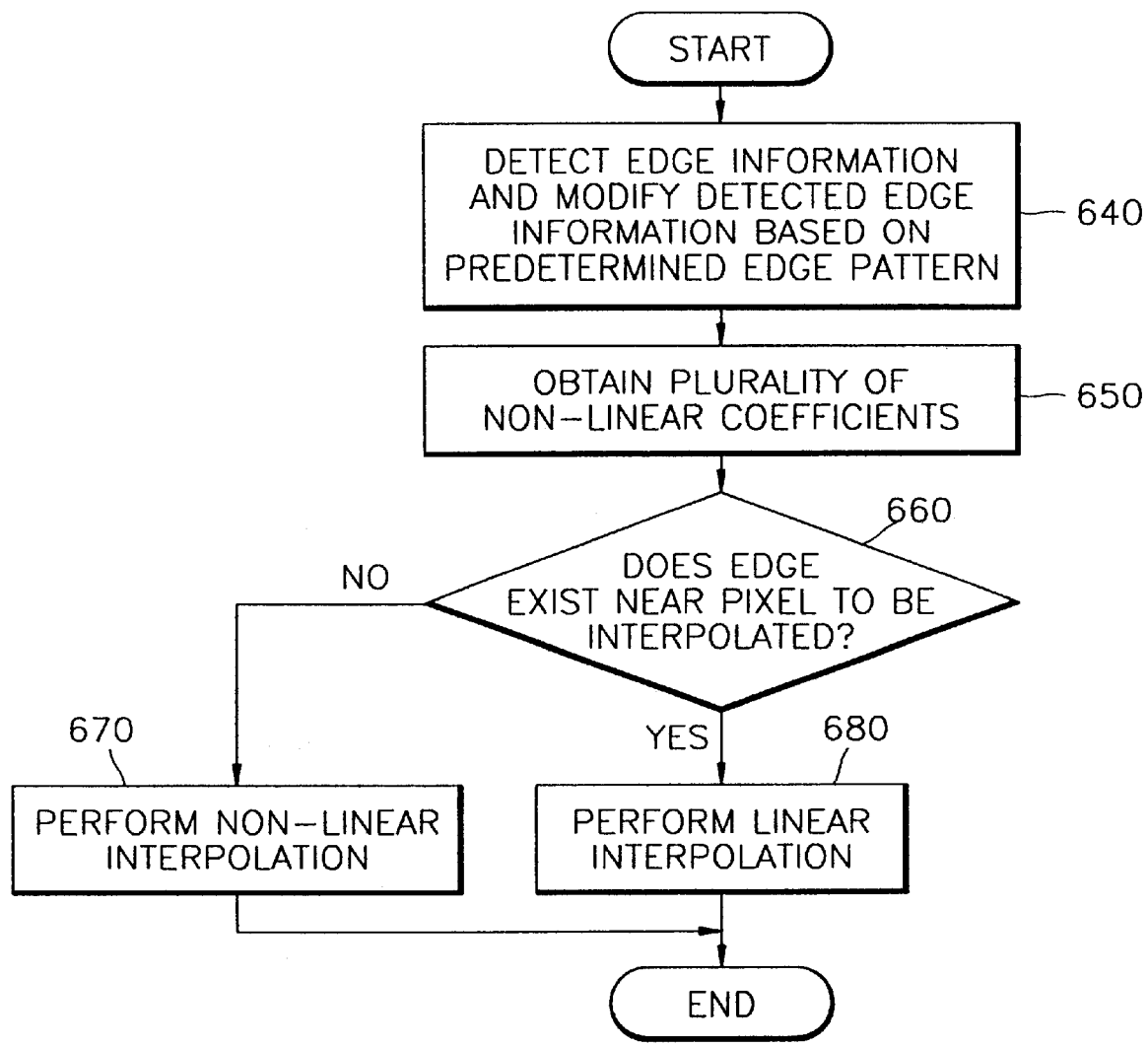
FIG. 18 is a flowchart illustrating a 2-dimensional mixing interpolation method according to an embodiment of the present invention.

FIG. 18 is a flowchart illustrating a 2-dimensional mixing interpolation method according to the present invention. Referring to FIGS. 12 and 18, in step 640, the edge detection and non-linear interpolation coefficient generation unit 330 detects edge information among pixels from a video signal input through the input terminal IN and modifies the detected edge information based on predetermined edge patterns.

In step 650, the edge detection and non-linear interpolation coefficient generation unit 330 obtains a plurality of 2-dimensional non-linear interpolation coefficients based on the modified shape of an edge among a plurality of pixels around the pixel to be interpolated.

In step 660, it is determined whether an edge exists among the plurality of pixels around the pixel to be interpolated. When it is determined that an edge does not exist, in step 680, n-th order linear interpolation is performed using n*n pixels around the pixel to be interpolated. For example, as described above, vertical linear interpolation is performed using the vertical linear interpolation coefficients Cv1–Cvn, and then horizontal linear interpolation is performed using the horizontal linear interpolation coefficients Ch1–Chn, so that a final linearly interpolated pixel is output.

On the other hand, when it is determined that an edge exists, in step 670, the four pixels around the pixel to be interpolated are multiplied by the 2-dimensional non-linear interpolation coefficients W_NW, W_NE, W_SW and W_SE, thereby performing non-linear interpolation on the pixel to be interpolated near the edge.

Although not illustrated in the drawings, steps 660 through 680 of FIG. 18 can be modified as described below. When referring to FIG. 17, after step 650, the vertical linear interpolation unit 600 performs vertical linear interpolation using the n*n pixels around the pixel to be interpolated and generates n vertically interpolated pixels. Thereafter, it is determined whether an edge exists among a plurality of pixels around the pixel to be interpolated based on the edge signal EDG. When it is determined that an edge exists near the pixel to be interpolated, the horizontal and near-edge interpolation unit 620 multiplies the four pixels PNE, PNW, PSE and PSW from the first MUX 610 by the plurality of 2-dimensional non-linear interpolation coefficients W_NW, W_NE, W_SW and W_SE from the second MUX 630, thereby performing non-linear interpolation on the pixel to be interpolated near the edge.

On the other hand, when it is determined that an edge does not exist near the pixel to be interpolated, the horizontal and near-edge interpolation unit 620 multiplies vertically interpolated pixels output from the first MUX 610 by horizontal interpolation coefficients Ch1–Chn from the second MUX 630, thereby performing horizontal linear interpolation on the pixel to be interpolated.

As described above, in a 2-dimensional mixing interpolation system and method according to the present invention, linear interpolation or non-linear interpolation is selectively performed depending on whether a graphic edge exists near a pixel to be interpolated. Accordingly, even when a video image including both a graphic image and a natural image is magnified, the resolution of the video image can be maintained without degradation of graphic edges.

The drawings and specification disclose optimal embodiments. Here, special terms are used, but they are used only to explain the present invention, not to restrict meanings or limit the scope of the present invention as set forth in the following claims.

According to the present invention, even when a video image is magnified using non-linear interpolation, the resolution of a text or graphic image can be maintained without distortion of edges and aliasing. In addition, the present invention performs 2-dimensional non-linear interpolation only on a portion from which an edge is detected in an input video signal and performs linear interpolation on the other portion from which an edge is not detected, so that efficient interpolation can be performed on a video image including both graphic and natural images depending on the characteristics of a video signal without degradation of graphic edges.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. An interpolation system comprising:

an edge detector for detecting edge information among pixels from a video signal applied through an input terminal;

an edge direction modifier for converting the edge information detected by the edge detector on the basis of a center point among peripheral pixels of an interpolation position and outputting modified edge information;

a near-edge coefficient generator for converting the coordinates of the interpolation position based on the modified edge information to generate a converted interpolation position, generating edge patterns corresponding to the converted interpolation position, and generating a plurality of two-dimensional interpolation coefficients in response to predetermined one-dimensional non-linear interpolation filter coefficients;

a filter coefficient generator for generating the one-dimensional non-linear interpolation filter coefficients in response to the coordinates of the converted interpolation position, the edge patterns and predetermined one-dimensional filter coefficients; and a non-linear interpolation unit for multiplying data values associated with the peripheral pixels by the plurality of two-dimensional non-linear interpolation coefficients to perform non-linear interpolation.

2. The interpolation system of claim 1, wherein the edge direction modifier generates the modified edge information comprising a center edge including horizontal, vertical and diagonal components and a border edge on the basis of the center point of four pixels around the interpolation position.

3. The interpolation system of claim 2, wherein the near-edge coefficient generator comprises:

a prototype center edge and rotation angle determiner for receiving the modified edge information and determining a prototype center edge, comprising a reference of the shape of an edge, and a rotation angle corresponding to the prototype center edge;

a coordinate converter for converting the coordinates of the interpolation position according to the rotation angle and outputting converted coordinates as the coordinates of the converted interpolation position;

an edge pattern determiner for receiving the coordinates of the converted interpolation position and generating the different types of edge patterns in response to the border edge and the prototype center edge;

a near-edge interpolation coefficient calculator for performing an operation on the converted interpolation position and the one-dimensional non-linear interpolation filter coefficients in response to the prototype center edge and generating first through fourth near-edge two-dimensional non-linear interpolation coefficients in response to the results of the operation; and a coordinate rerotating unit for rerotating the first through fourth near-edge two-dimensional non-linear interpolation coefficients by the rotation angle and outputting the rerotated coefficients as the two-dimensional non-linear interpolation coefficients.

4. The interpolation system of claim 3, wherein the prototype center edge generated by the prototype center edge and rotation angle determiner is one of a corner type edge, a perpendicular type edge, a full line edge, a cross bar edge, a half line edge and a diagonal type edge depending on the shape of the center edge, and each of the prototype center edges of the five types other than the cross bar is represented using at least one rotation angle among the angles 0°, 90°, 180° and 270°.

5. The interpolation system of claim 3, wherein the coordinates of the converted interpolation position are obtained according to the relationships:

$$\begin{bmatrix} X' \\ Y' \end{bmatrix} = \begin{bmatrix} \cos\theta & -\sin\theta \\ \sin\theta & \cos\theta \end{bmatrix} \begin{bmatrix} X \\ Y \end{bmatrix}$$

$$X = x - 0.5, Y = Y - 0.5$$

$$x' = \cos\theta x - \sin\theta y + (\sin\theta - \cos\theta + 1) * 0.5$$

$$y' = \sin\theta x + \cos\theta y + (1 - \sin\theta - \cos\theta) * 0.5$$

where x and y are the coordinates of the interpolation position, x' and y' are the coordinates of the converted interpolation position, and θ represents the rotation angle.

6. The interpolation system of claim 3, wherein the edge pattern determiner divides the edge patterns into a single edge pattern, a twin edge pattern and a periodic edge pattern depending on the absence or existence of the border edge which has been rotated according to the rotation angle.

7. The interpolation system of claim 6, wherein the edge pattern determiner comprises a multiplexer for receiving the bits of the rotated border edge as an input signal and selectively outputs bits of the rotated border edge in response to predetermined bits of data indicating the prototype center edge and the coordinates of the converted interpolation position, outputs horizontal and diagonal edge patterns by adding a predetermined bit indicating a diagonal edge to a horizontal border edge among the outputs of the multiplexer, and outputs a vertical border edge among the outputs of the multiplexer as a vertical edge pattern.

8. The interpolation system of claim 3, wherein the near-edge interpolation coefficient calculator comprises:
   a multiplexer for receiving the coordinates of the one-dimensional non-linear filter interpolation coefficients, the coordinates of the converted interpolation position, the complements of the coordinates and one of the near-edge two-dimensional interpolation coefficients as multiple inputs, and data of predetermined bits indicating the prototype center edge as a selection signal; and
   a plurality of multipliers for combining the outputs of the multiplexer, multiplying the combined outputs by each other, and outputting the multiplied results as the first through fourth near edge two-dimensional non-linear interpolation coefficients.

9. The interpolation system of claim 1, further comprising a look-up table for storing the one-dimensional filter coefficients.

10. A method of performing two-dimensional non-linear interpolation on an input video signal, the method comprising:
   (a) detecting edge information from the input video signal;
   (b) modifying the detected edge information to generate modified edge information;
   (c) generating two-dimensional non-linear interpolation coefficients in response to the modified edge information and predetermined one-dimensional non-linear interpolation filter coefficients; and
   (d) multiplying data values associated with peripheral pixels around a current interpolation position by the two-dimensional non-linear interpolation coefficients, thereby performing non-linear interpolation on the video signal.

11. The method of claim 10, wherein step (c) comprises:
   (c1) receiving the modified edge information, determining one among a plurality of prototype center edges as a center edge type and determining a rotation angle corresponding to the selected prototype center edge;
   (c2) converting the coordinates of the current interpolation position according to the rotation angle and generating the coordinates of a converted interpolation position;
   (c3) generating a plurality of edge patterns in response to the coordinates of the converted interpolation position and a border edge of the modified edge information;
   (c4) generating the one-dimensional non-linear interpolation filter coefficients in response to the coordinates of the converted interpolation position, the plurality of edge patterns and predetermined one-dimensional filter coefficients;
   (c5) generating near-edge two-dimensional non-linear interpolation coefficients in response to the prototype center edge, the coordinates of the converted interpolation position and the one-dimensional non-linear interpolation filter coefficients; and
   (c6) rerotating the near-edge two-dimensional non-linear interpolation coefficients by the rotation angle and outputting the results of the rerotation as the two-dimensional non-linear interpolation coefficients.

12. The method of claim 11, wherein during step (c1), the prototype center edges comprise at least one of a corner type edge, a perpendicular type edge, a full line edge, a cross bar edge, a half line edge and a diagonal type edge depending on the shape of the center edge, and each of the prototype center edges of the five types other than the cross bar is represented using at least one rotation angle among the angles 0°, 90°, 180° and 270°.

13. The method of claim 11, wherein step (c3) generates the edge patterns which are divided into a single edge pattern, a twin edge pattern and a periodic edge pattern depending on the absence or existence of the border edge which has been rotated by the rotation angle.

14. The method of claim 11, wherein the step (c5) comprises the sub-steps of:
   (c51) selectively outputting the coordinates of the one-dimensional non-linear filter interpolation coefficients, the coordinates of the converted interpolation position and the complements of the coordinates as vertical and horizontal values; and
   (c52) combining the selectively output values, multiplying the combined values by each other, and outputting the multiplied results as the near edge two-dimensional non-linear interpolation coefficients.

15. A two-dimensional mixing interpolation system comprising:
   an edge detection and non-linear interpolation coefficient generation unit for detecting edge information among pixels from a video signal received at an input terminal, modifying the detected edge information according to predetermined edge patterns, obtaining a plurality of two-dimensional non-linear interpolation coefficients based on the modified edge information among a plurality of adjacent pixels around a pixel to be interpolated, and generating an edge signal indicating the absence or existence of an edge among the plurality of adjacent pixels around the pixel to be interpolated;

a linear interpolation unit for multiplying data values associated with n*n pixels around the pixel to be interpolated by vertical interpolation coefficients and by horizontal interpolation coefficients to perform linear interpolation;

a non-linear interpolation unit for multiplying data values associated with the plurality of adjacent pixels by the plurality of two-dimensional non-linear interpolation coefficients to perform non-linear interpolation near an edge; and a multiplexer for selectively outputting an interpolated pixel from the linear interpolation unit or an interpolated pixel from the non-linear interpolation unit in response to the edge information.

16. The two-dimensional mixing interpolation system of claim 15, wherein the edge detection and non-linear interpolation coefficient generation unit comprises:

an edge detector for detecting the edge information among pixels from the video signal;

an edge direction modifier for modifying the edge information detected by the edge detector on the basis of a pivot of the plurality of adjacent pixels around an interpolation position and outputting the modified edge information;

an edge coefficient generator for converting the coordinates of the interpolation position based on the modified edge information to generate a converted interpolation position, generating edge patterns corresponding to the converted interpolation position, and generating the plurality of two-dimensional non-linear interpolation coefficients in response to predetermined one-dimensional non-linear interpolation filter coefficients; and a filter coefficient generator for generating the one-dimensional non-linear interpolation filter coefficients in response to the coordinates of the converted interpolation position, the edge patterns and predetermined one-dimensional filter coefficients.

17. A two-dimensional mixing interpolation system comprising:

an edge detection and non-linear interpolation coefficient generation unit for detecting edge information among pixels from a video signal input through an input terminal, modifying the detected edge information according to predetermined edge patterns, obtaining a plurality of two-dimensional non-linear interpolation coefficients based on the modified edge information among a plurality of adjacent pixels around a pixel to be interpolated, and generating an edge signal indicating the absence or existence of an edge among the plurality of adjacent pixels around the pixel to be interpolated;

a vertical linear interpolation unit for multiplying data values associated with n*n pixels around the pixel to be interpolated by plurality of vertical interpolation coefficients to perform vertical interpolation;

a first multiplexer for selectively outputting vertically interpolated pixels from the vertical linear interpolation unit or the plurality of adjacent pixels in response to the edge signal;

a second multiplexer for selectively outputting a plurality of horizontal interpolation coefficients or the plurality of two-dimensional non-linear interpolation coefficients in response to the edge signal; and a horizontal and near-edge interpolation unit for multiplying data values associated with pixels selectively output from the first multiplexer by interpolation coefficients selectively output from the second multiplexer to perform linear interpolation or non-linear interpolation near an edge.

18. A method of performing two-dimensional mixing interpolation on an input video signal, the method comprising:

(a) detecting edge information among a plurality of adjacent pixels around a pixel to be interpolated from the input video signal and modifying the detected edge information into a predetermined edge pattern;

(b) obtaining a plurality of two-dimensional non-linear interpolation coefficients based on the edge pattern;

(c) determining whether an edge exists among the plurality of pixels around the pixel to be interpolated;

(d) multiplying data values associated with n*n pixels around the pixel to be interpolated by a plurality of vertical and horizontal interpolation coefficients to perform linear interpolation when it is determined that an edge does not exist in step (c); and (e) multiplying data values associated with the plurality of adjacent pixels by the plurality of two-dimensional non-linear interpolation coefficients to perform non-linear interpolation near an edge when it is determined that an edge exists in step (c).

19. The method of claim 18, wherein steps (c) through (e) comprise:

(f) multiplying data values associated with the n*n pixels around the pixel to be interpolated by the vertical interpolation coefficients to perform vertical linear interpolation and generating vertically interpolated pixels;

(g) determining whether an edge exists among the plurality of adjacent pixels;

(h) multiplying data values associated with the vertically interpolated pixels generated in the step (f) by the horizontal interpolation coefficients to perform horizontal linear interpolation when it is determined that an edge does not exist in step (g); and (i) multiplying data values associated with the plurality of adjacent pixels by the plurality of two-dimensional non-linear interpolation coefficients to perform non-linear interpolation near an edge when it is determined that an edge exists in step (g).

* * * * *